(12) United States Patent  
Iwakura et al.

(10) Patent No.: US 8,130,325 B2  
(45) Date of Patent: Mar. 6, 2012

(54) LUMINANCE LEVEL CONTROL DEVICE

(75) Inventors: Noriyuki Iwakura, Hokkaido (JP); Nobuo Taketani, Hyogo (JP); Takeru Yamashita, Osaka (JP); Shozo Tozaki, Kyoto (JP); Takashi Ootomo, Hokkaido (JP); Hiroshi Yoshinari, Osaka (JP)

(73) Assignee: Panasonic Corporation, Osaka (JP)

( * ) Notice: Subject to any disclaimer, the term of this patent is extended or adjusted under 35 U.S.C. 154(b) by 565 days.

(21) Appl. No.: 12/446,039

(22) PCT Filed: Nov. 26, 2007

(86) PCT No.: PCT/JP2007/072781  
§ 371 (c)(1),  
(2), (4) Date: Apr. 17, 2009

(87) PCT Pub. No.: WO2008/066005  
PCT Pub. Date: Jun. 5, 2008

(65) Prior Publication Data  
US 2010/0321581 A1  Dec. 23, 2010

(30) Foreign Application Priority Data  
Nov. 27, 2006 (JP) ................. 2006-318236

(51) Int. Cl.  
*H04N 5/57* (2006.01)  
*H04N 5/14* (2006.01)

(52) U.S. Cl. ............... 348/687; 348/673; 348/678

(58) Field of Classification Search ........... 348/687, 348/690, 671, 673, 647, 678, 679, 700; *H04N 5/57, H04N 5/14, 5/52, 9/68, 9/64*  
See application file for complete search history.

(56) References Cited

U.S. PATENT DOCUMENTS 6,278,421 B1  8/2001 Ishida et al.  
7,199,840 B2 *  4/2007 Shiota ......................... 348/678  
(Continued)

FOREIGN PATENT DOCUMENTS  
CN  1419373  5/2003  
(Continued)

OTHER PUBLICATIONS

English language Abstract of JP 2004-4606, Jan. 8, 2004.  
English language Abstract of JP 2000-330505, Nov. 30, 2000.  
English language Abstract of JP 2003-29698, Jan. 31, 2003.  
Search report from E.P.O. in EP 07 83 2506, mail date is Mar. 10, 2011.

*Primary Examiner* — Sherrie Hsia  
(74) *Attorney, Agent, or Firm* — Greenblum & Bernstein, P.L.C.

(57) ABSTRACT

A scene change detecting circuit (1) detects a scene change of video. An average luminance level operating circuit (2) calculates an average luminance level (APL) of a video signal (VD). A luminance overdrive amount calculating circuit (3) calculates a luminance overdrive amount (OD) based on the average luminance level (APL). A time-linked attenuating circuit (7) outputs a power consumption limit correction amount (PA) by attenuating the luminance overdrive amount (OD) with an elapse of time from a point in time of detecting the scene change. An adder (8) adds the power consumption limit correction amount (PA) and a reference power consumption limit value (Lp) to output the addition result as a power consumption limit amount (PL). An ABL circuit (4) calculates a luminance limit amount (BL) based on luminance limit characteristics, the average luminance level (APL) and the power consumption limit amount (PL). A luminance level control circuit (5) determines a display drive condition (BC) based on the luminance limit amount (BL). A PDP drive controller (6) drives a display panel (20) based on the video signal (VD) and the display driving condition (BC).

11 Claims, 19 Drawing Sheets

U.S. PATENT DOCUMENTS

| | | |
|---|---|---|
| 7,965,342 B2 * | 6/2011 | Nobori .................... 348/687 |
| 2002/0033814 A1 | 3/2002 | Kasahara et al. |
| 2002/0033815 A1 | 3/2002 | Kasahara et al. |
| 2002/0036633 A1 | 3/2002 | Kasahara et al. |
| 2003/0011543 A1 | 1/2003 | Hosoi et al. |
| 2003/0085905 A1 | 5/2003 | Mori et al. |
| 2003/0090488 A1 | 5/2003 | Yoo |
| 2003/0193451 A1 | 10/2003 | Kimura |
| 2003/0218432 A1 | 11/2003 | Song et al. |
| 2006/0012615 A1 | 1/2006 | Mori et al. |
| 2006/0115912 A1 | 6/2006 | Masumoto |
| 2006/0284899 A1 | 12/2006 | Kimura |
| 2007/0126757 A1 | 6/2007 | Itoh et al. |

FOREIGN PATENT DOCUMENTS

| | | |
|---|---|---|
| EP | 0841652 | 5/1998 |
| JP | 8-223507 | 8/1996 |
| JP | 2000-330505 | 11/2000 |
| JP | 2003-29698 | 1/2003 |
| JP | 2003-153123 | 5/2003 |
| JP | 2004-4606 | 1/2004 |
| WO | 2005/081217 | 9/2005 |

* cited by examiner

F I G. 9
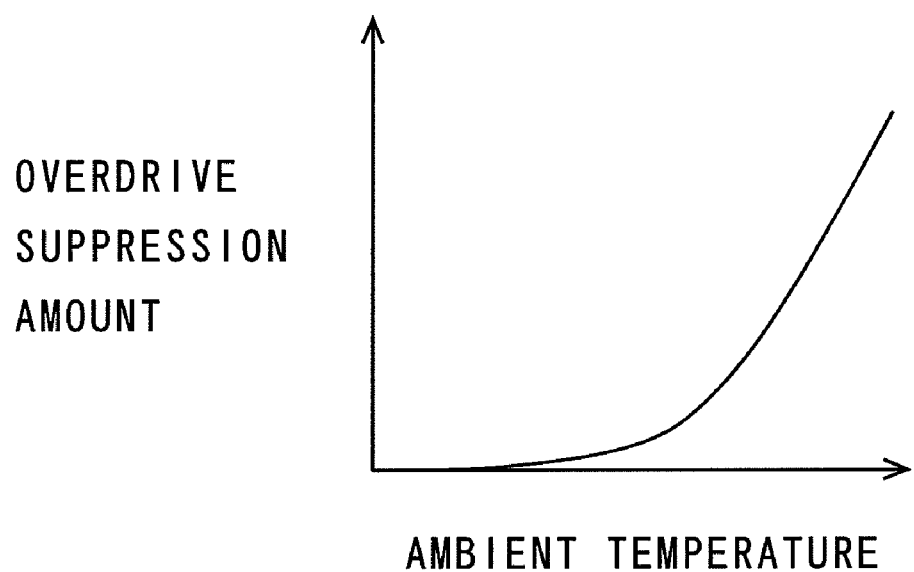

F I G. 1 5
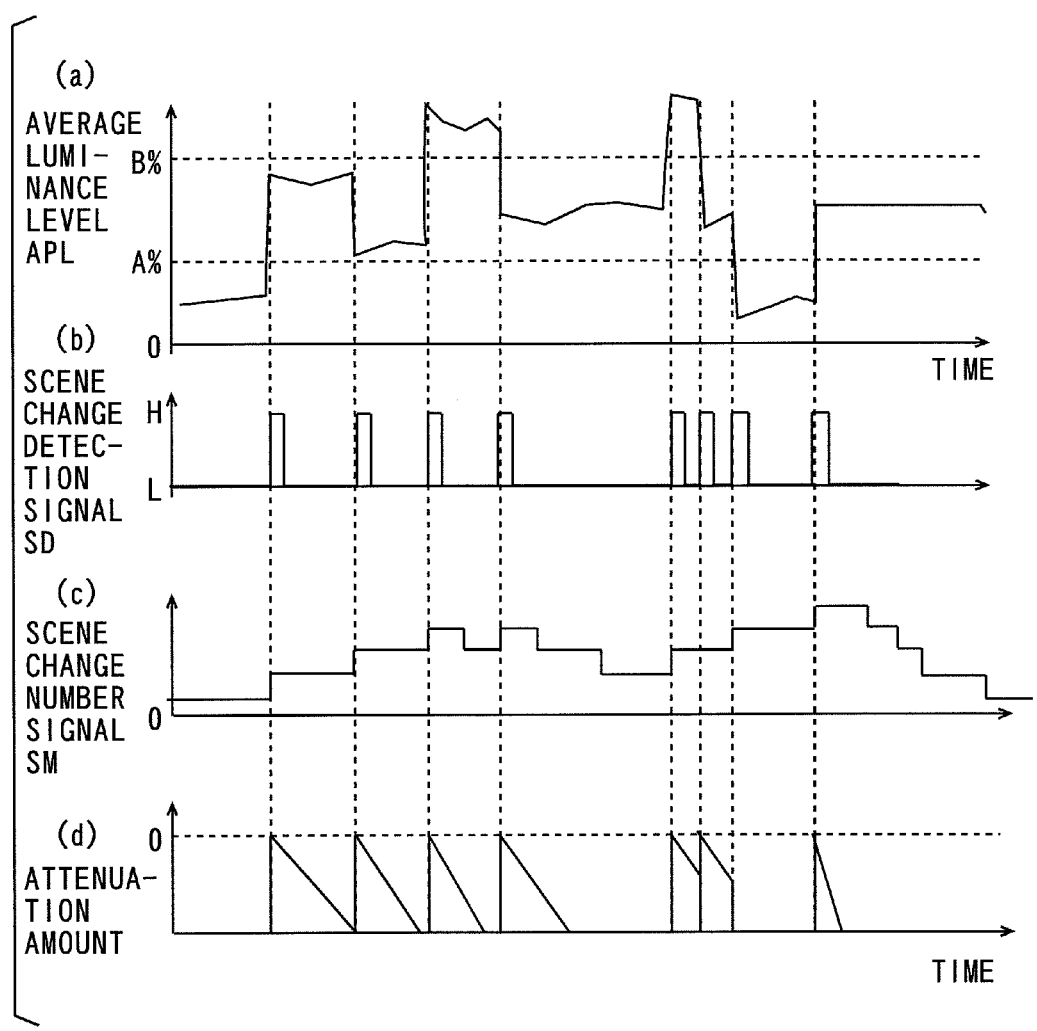

LUMINANCE LEVEL CONTROL DEVICE

TECHNICAL FIELD

The present invention relates to a luminance level control device that controls a luminance level of video to be displayed on a display panel.

BACKGROUND ART

A plasma display panel includes a plurality of discharge cells arranged in the form of a matrix. In this plasma display panel, gas discharges are induced in the selected discharge cells, generating ultraviolet rays. The ultraviolet rays cause phosphors in the discharge cells to be excited, so that the discharge cells emit light. The number of times of discharges in the discharge cells per unit time, that is, the number of discharge sustain pulses applied to the discharge cells is controlled, thereby enabling display of luminance in multiple levels of gray.

Generally, a sub-field method is employed as a driving system of the plasma display panel. In the sub-field method, one field corresponding to one screen of video is temporally divided into a plurality of sub-fields, and the ratio of a light emission sustain period in each sub-field is set to a power of two, thus performing display in multiple levels of gray by combining the foregoing sub-fields. For example, when the ratios of the light emission sustain periods of eight sub-fields are set to 1:2:4:8:16:32:64:128, respectively, the sub-fields are combined to realize 256 levels of gray. Patent Document 1 discloses a technique relating to the sub-field method, for example.

Moreover, there exists a plasma display device having an ABL (Automatically Brightness Limit) function that variably sets the number of the discharge sustain pulses in each sub-field depending on an average peak level (APL) of an input image signal, mainly for purpose of reduction in power consumption. In the plasma display device having the ABL function, a characteristic curve indicating the relationship of the number of the discharge sustain pulses to the average peak level is stored in a memory, and the number of the discharge sustain pulses is determined depending on a detected value of the average peak level with reference to this characteristic curve.

In the above-described plasma display device, the ABL function causes the number of the discharge sustain pulses to be decreased in each sub-field when a high average peak level is detected, so that brightness of the whole screen is decreased. On the other hand, the number of the discharge sustain pulses is increased in each sub-field when a low average peak level is detected, so that brightness of the whole screen is increased.

For example, Patent Document 2 discloses a display control device having the ABL function for controlling a light emission luminance of the plasma display panel. The display control device holds in a storage a plurality of kinds of characteristic curves, which are a characteristic curve for standard use, a characteristic curve for preventing image burn-in, a characteristic curve for power saving and so on. A user can select any from these characteristic curves depending on the situation.

Here, description is made of the ABL function. FIG. 16 is a diagram showing the characteristics of the ABL function. FIG. 17 is a schematic view for use in explaining the ABL function.

FIG. 16 (a) shows the relationship between the average peak level APL and power consumption, and FIG. 16 (b) shows the relationship between the average peak level APL and the number of the discharge sustain pulses. The average peak level APL represents an average luminance level of video displayed by a video signal to be input. The larger the number of the discharge sustain pulses is, the higher the luminance level of the displayed video is.

As shown in FIG. 16 (b), the number of the discharge sustain pulses is kept constant irrespective of the average peak level APL in a region where the average peak level APL is lower than a certain value. In this case, power consumption rises with the increase in the average peak level APL as shown in FIG. 16 (a).

As shown in FIG. 16 (b), the number of the discharge sustain pulses is decreased with the increase in the average peak level APL in an ABL operating region where the average peak level APL is not less than the above-mentioned certain value. This causes power consumption to be kept constant irrespective of the average peak level APL as shown in FIG. 16 (a).

Consideration is made on a case where input video V1 having a comparatively low average peak level APL1 is supplied and a case where input video V2 having a comparatively high average peak level APL2 is supplied, for example. The input video means video displayed by the video signal to be input.

In this case, the number of the discharge sustain pulses when the input video V2 having the average peak level APL2 is supplied is lower by Op than the number of the discharge sustain pulses when the input video V1 having the average peak level APL1 is supplied. Thus, the luminance level of displayed video when the input video V2 is supplied is lower than the luminance level of the input video V2. Here, the displayed video represents video actually displayed on the screen.

FIG. 17 (a) shows the input video V1 having the low average peak level APL1. A partial region A in the input video V1 has a higher luminance level than that of a peripheral region B. FIG. 17 (b) shows the input video V2 having the high average peak level APL2. The partial region A in the input video V2 has a higher luminance level than that of a peripheral region C. The luminance level of the partial region A is equal in the input video V1, the input video V2.

In this example, the luminance level of the partial region A of the displayed video when the input video V2 is supplied is lower than the luminance level of the partial region A of the displayed video when the input video V1 is supplied.

As described above, the luminance level of an arbitrary region of the displayed video changes depending on the average peak level of the input video even when the luminance level of the input video is equal.

The ABL function suppresses the rise in power consumption with the increase in the average peak level. However, since the ABL characteristics cause the luminance level of the displayed video to be immediately controlled every time the average peak level changes, it has a disadvantage in that unnatural changes in luminance are visually recognized.

Therefore, Patent Document 3 discloses a luminance level control device for preventing the changes in luminance of the displayed video from being visually recognized.

FIG. 18 is a block diagram showing the configuration of a conventional luminance level control device disclosed in Patent Document 3.

A scene change detecting circuit 31 detects a scene change based on the input video signal. An average peak level operating circuit 32 calculates the average peak level of the input video signal, and outputs an average peak level signal indicating the result.

When the scene change is detected by the scene change detecting circuit 31, a luminance level switching circuit 33 outputs the average peak level signal output from the average peak level operating circuit 32. On the other hand, when the scene change is not detected by the scene change detecting circuit 31, the luminance level switching circuit 33 does not output the average peak level signal that is obtained in the average peak level operating circuit 32, but continuously outputs the same average peak level signal that has been output.

An automatically luminance limiting circuit 34 outputs setting data for setting a luminance and a video contrast suitable for the content of video based on the average peak level signal output from the luminance level switching circuit 33.

A luminance level control circuit 35 receives the setting data output from the automatically luminance limiting circuit 34, and outputs automatically luminance limiting data for controlling the luminance and contrast. A PDP (Plasma Display Panel) drive controller 36 causes the video to be displayed on a plasma display panel based on the input video signal and the automatically luminance limiting data.

In this manner, the luminance level of the plasma display panel can be controlled only when the scene change is detected.

[Patent Document 1] JP 2004-4606 A
[Patent Document 2] JP 2003-29698 A
[Patent Document 3] JP 2000-330505 A

DISCLOSURE OF THE INVENTION

Problems to be Solved by the Invention

FIG. 19 is a diagram showing the operation of the luminance level control device disclosed in Patent Document 3 in the ABL characteristics.

FIG. 19 (a) shows the relationship between the average peak level APL and power consumption, and FIG. 19 (b) shows the relationship between the average peak level APL and the number of the discharge sustain pulses.

As shown in FIG. 19 (b), in the ABL operating region, when the scene change is detected, the number of the discharge sustain pulses decreases as the average peak level APL increases. Accordingly, power consumption is kept constant irrespective of the average peak level APL as shown in FIG. 19 (a).

When the average peak level of the input video is APLa, the number of the discharge sustain pulses attains a value of the point Pa because of the ABL characteristics. Consideration is made on a case where the average peak level of the input video changes to APLb. When the scene change is not detected, the number of the discharge sustain pulses does not change and is kept at a value of the point PC, which is the same as the value of the point Pa. When the scene change is detected, the number of the discharge sustain pulses changes to a value of the point Pd that is lower than the value of the point Pa.

As described above, the luminance level of the plasma display panel is controlled only when the scene change is detected in the input video, so that unnatural changes in luminance caused by changes in the average peak level of the video can be suppressed.

In the luminance level control device described in Patent Document 3, when the video signal having the high average peak level is input, the number of the discharge sustain pulses is decreased because of the ABL function, thereby reducing power consumption. However, high luminance video cannot be displayed.

On the other hand, when the ABL function is not employed, the number of the discharge sustain pulses is not reduced. In this case, high luminance video can be displayed, but reduction in power consumption cannot be achieved. As described above, a high luminance and low power consumption cannot be compatibly achieved in the case of the video signal having the high average peak level.

An object of the present invention is to provide a luminance level control device capable of achieving both display with a high luminance and lower power consumption.

Means for Solving the Problems (1) According to an aspect of the present invention, a luminance level control device that controls a luminance level of video displayed by a display includes a calculator that calculates an average luminance level of an input video signal, a detector that detects a scene change of the video based on the input video signal, and a luminance controller that increases a luminance level of the video displayed in the display based on the video signal in response to detection of the scene change by the detector and attenuates the luminance level of the video with an elapse of time from a point in time of detecting the scene change by the detector.

In the luminance level control device, the average luminance level of the input video signal is calculated by the calculator. Moreover, the scene change of the video is detected by the detector based on the input video signal. Furthermore, the luminance level of the video displayed in the display based on the video signal is increased by the luminance controller in response to the detection of the scene change, and the luminance level of the video is attenuated with the elapse of time from the point in time of detecting the scene change.

When video of a high luminance level is displayed at the time of the scene change, a viewer perceives the video as having a high contrast because of visual characteristics of a human. On the other hand, the low luminance level of the displayed video has small effect on a sense of perceiving the contrast when the scene change is not carried out.

As described above, since the luminance level of the video increases at the time of the scene change, the viewer can clearly recognize the scene change. In addition, the luminance level of the video attenuates with the elapse of time after the scene change, so that power consumption is reduced. Since frequency of scene changes of video is not high in general video, average power consumption can be sufficiently reduced.

The luminance and power consumption are temporally dispersed, thereby achieving both high luminance display and reduction in power consumption.

(2) The luminance controller may include a generator that generates a luminance overdrive amount for increasing the luminance level depending on the average luminance level calculated by the calculator, an attenuator that attenuates the luminance overdrive amount generated by the generator based on the elapse of time from the point in time of detecting the scene change by the detector, and a luminance level controller that controls the luminance level of the video displayed in the display based on the luminance overdrive amount obtained by the attenuator.

In this case, the luminance overdrive amount for increasing the luminance level depending on the average luminance level is generated by the generator, and the luminance overdrive amount is attenuated by the attenuator based on the elapse of time from the point in time of detecting the scene change. Furthermore, the luminance level of the video displayed in the display is controlled based on the attenuated luminance overdrive amount. Thus, the luminance level of the video is increased at the time of detecting the scene change, and the luminance level of the video is attenuated with the elapse of time from the point in time of detecting the scene change.

(3) The attenuator may generate an attenuation amount that changes with the elapse of time from the point in time of detecting the scene change by the detector, and attenuate the luminance overdrive amount by subtracting the generated attenuation amount from the luminance overdrive amount generated by the generator.

In this case, the luminance level of the video can be easily increased/decreased by changing the attenuation amount.

(4) The attenuation amount generated by the attenuator may change in proportion to the elapse of time from the point in time of detecting the scene change by the detector.

In this case, the luminance level of the video is linearly attenuated with the elapse of time from the point in time of detecting the scene change. Thus, power consumption gradually decreases with the elapse of time.

(5) The attenuation amount generated by the attenuator may be maintained in a certain value after an elapse of a predetermined period of time from the point in time of detecting the scene change by the detector.

In this case, an excessively low luminance level is prevented.

(6) The generator may generate the luminance overdrive amount when the average luminance level calculated by the calculator is not less than a first threshold value and not more than a second threshold value.

When the average luminance level is excessively high, sufficiently high luminance video can be displayed without generating the luminance overdrive amount. In this case, the range of the average luminance level processed by the generator is limited, thus relaxing a design condition of the generator.

(7) The luminance level control device may further include a first suppressor that detects the number of the scene changes within a unit time and suppresses the luminance overdrive amount generated by the generator based on the number of the scene changes that is detected.

In this case, the luminance overdrive amount is suppressed based on the number of the scene changes within a unit time, thus preventing a continuously high state of power consumption in video with the large number of the scene changes. This enables reduction in power consumption even when the scene changes are frequently generated.

(8) The luminance level control device may further include a second suppressor that measures an ambient temperature of the luminance level control device and suppresses the luminance overdrive amount that is generated by the generator based on the measured ambient temperature.

The frequent scene changes cause the continuously high state of power consumption to raise the temperature of the luminance level control device, resulting in the rise in the ambient temperature. In this case, the luminance overdrive amount is suppressed based on the ambient temperature, thus suppressing the increase in power consumption. Moreover, a failure of a peripheral apparatus due to the heat generated by the luminance level control device can be prevented.

(9) The luminance level control device may further include a judger that judges a classification of a program displayed by the input video signal, and a first attenuation rate controller that controls an attenuation rate of the luminance overdrive amount attenuated by the attenuator based on the classification of the program that is judged by the judger.

In this case, since the attenuation ratio of the luminance overdrive amount is controlled based on the classification of the program, power consumption can be reduced in a short period of time every time the scene change is generated in a program with the large number of the scene changes. Accordingly, power consumption can be reduced even when the scene changes are frequently generated.

(10) The luminance level control device may further include an attenuation continuing controller that controls the attenuator so that the luminance overdrive amount continues to be attenuated for a certain period of time from the point in time of detecting the scene change by the detector.

In this case, the luminance overdrive amount continues to attenuate for the certain period of time from the point in time of detecting the scene change, so that power consumption can be reduced for the certain period of time irrespective of the frequency of the scene changes. Accordingly, power consumption can be reduced even when the scene changes are frequently generated.

(11) The luminance level control device may further include a second attenuation rate controller that detects the number of the scene changes within a unit time and controls an attenuation rate of the luminance overdrive amount attenuated by the attenuator based on the detected number of the scene changes.

In this case, since the attenuation ratio of the luminance overdrive amount is controlled based on the number of the scene changes within a unit time, power consumption can be reduced in a short period of time every time the scene change is generated in the case of the frequent scene changes. Accordingly, power consumption can be reduced even when the scene changes are frequently generated.

EFFECTS OF THE INVENTION

According to the present invention, a viewer can clearly recognize a scene change because a luminance level of video increases at the time of the scene change. In addition, the luminance level of video attenuates with an elapse of time after the scene change, so that power consumption is reduced. Since the scene change of video is not very frequent in general video, average power consumption can be sufficiently reduced.

Luminance and power consumption are temporally dispersed, thus enabling both high luminance display and reduction in power consumption.

BRIEF DESCRIPTION OF THE DRAWINGS

FIG. 9 is a diagram showing operating characteristics of a temperature-linked control circuit.

FIG. 15 is a timing chart showing an operation of the luminance level control device according to the seventh embodiment.

BEST MODE FOR CARRYING OUT THE INVENTION

While description is made of a case where a display device is a plasma display in the following embodiments, the present invention is not limited to a plasma display. The present invention is similarly applicable to other display devices having an ABL (Automatically Brightness Limit) function such as a CRT television, an organic EL (electroluminescence) display and an FED (Field Emission Device) display.

(1) First Embodiment

Figure 1:
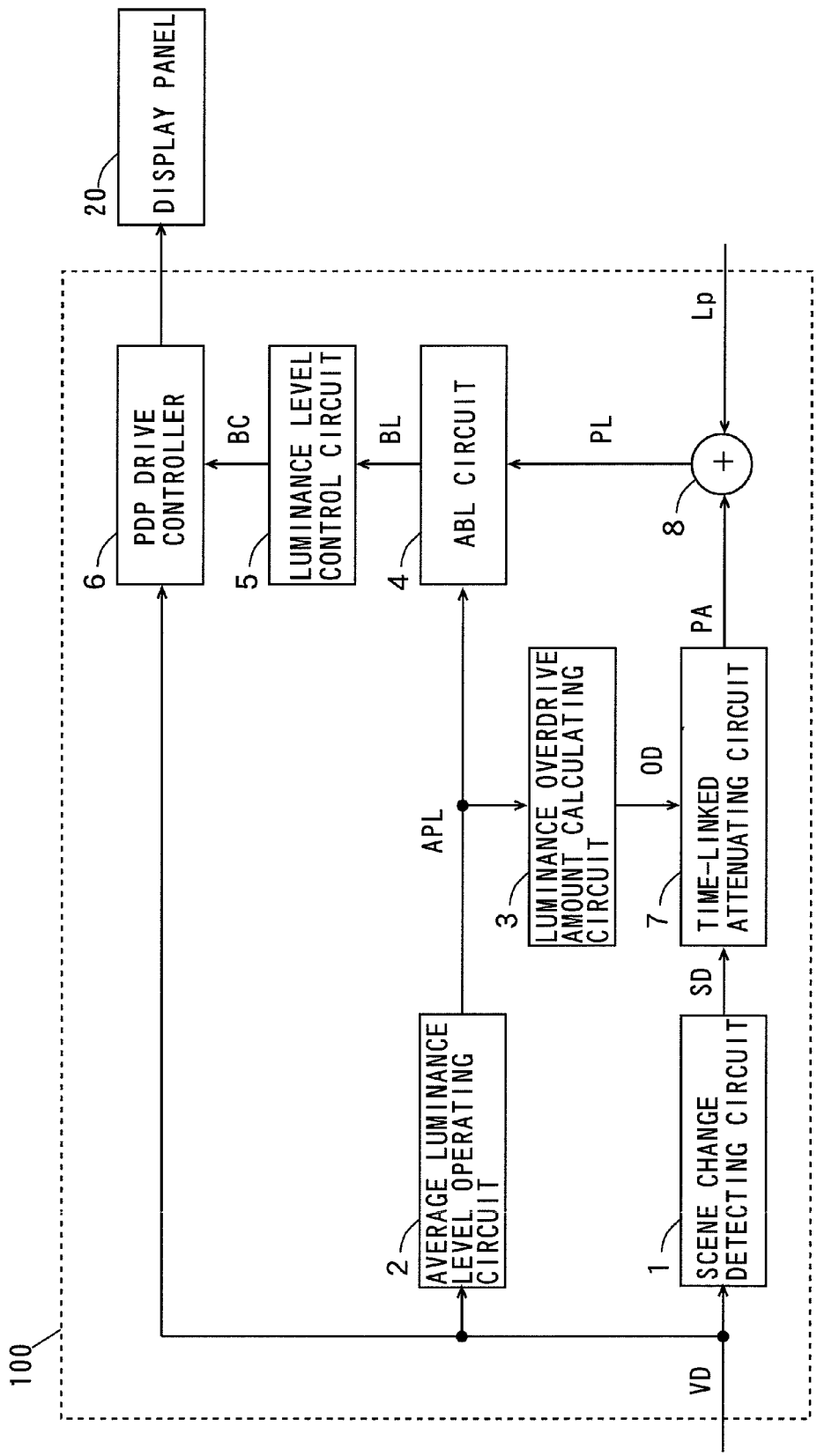
FIG. 1 is a block diagram showing the configuration of a luminance level control device according to a first embodiment of the present invention.

FIG. 1 is a block diagram showing the configuration of a luminance level control device according to a first embodiment of the present invention.

The luminance level control device 100 shown in FIG. 1 includes a scene change detecting circuit 1, an average luminance level operating circuit 2, a luminance overdrive amount calculating circuit 3, an automatically brightness limiting (hereinafter referred to as ABL) circuit 4, a luminance level control circuit 5, a plasma display panel (hereinafter referred to as PDP) drive controller 6, a time-linked attenuating circuit 7 and an adder 8. The luminance level control device 100 and a display panel 20 constitute a display device. In the present embodiment, the display panel 20 is a PDP.

A video signal VD representing video to be displayed is input to the scene change detecting circuit 1. The scene change detecting circuit 1 detects a scene change (switching of scenes) of the video based on changes in a video level of the input video signal VD, and outputs a scene change detection signal SD.

The following method, for example, can be employed as a method of detecting a scene change. A difference in luminance between a preceding frame and a current frame is calculated for each pixel to prepare a histogram of the difference. Next, the number of the pixels of which differences are not less than a predetermined value is obtained. When the ratio of the number of the calculated pixels to the total number of the pixels is not less than a predetermined value, it is judged that the scene change has been carried out. Note that the method of detecting the scene change is not limited to the foregoing method. For example, another method may be employed.

The average luminance level operating circuit 2 calculates an average luminance level APL of the input video signal VD. Here, the average luminance level is a parameter representing an average luminance of the video signal of one frame or part of the one frame. In the present embodiment, the average luminance level is expressed in percentage. 0% indicates the lowest average luminance level, in which the video is in the darkest state. 100% indicates the highest average luminance level, in which the video is in the brightest state.

The luminance overdrive amount calculating circuit 3 calculates a luminance overdrive amount OD based on the average luminance level APL output from the average luminance level operating circuit 2. The luminance overdrive amount OD is an amount of causing a display luminance level higher than the luminance level of the input video signal VD. The display luminance level is a level of luminance of video actually displayed on the display panel 20.

The time-linked attenuating circuit 7 measures an elapsed time from a point in time of detecting the scene change based on the scene change detection signal SD output from the scene change detecting circuit 1, attenuates the luminance overdrive amount OD output from the luminance overdrive amount calculating circuit 3 with an elapse of time, and outputs the attenuated luminance overdrive amount OD as a power consumption limit correction amount PA.

Specifically, the time-linked attenuating circuit 7 generates an attenuation amount increasing with an elapse of time from the point in time of detecting the scene change, and subtracts the attenuation amount from the luminance overdrive amount OD, thereby outputting the power consumption limit correction amount PA.

The adder 8 adds the power consumption limit correction amount PA output from the time-linked attenuating circuit 7 and a reference power consumption limit value Lp that is preset, and outputs the result of addition as a power consumption limit amount PL. Here, the reference power consumption limit value Lp is a fixed parameter, which is a reference parameter for calculating the power consumption limit amount PL.

The average luminance level APL output from the average luminance level operating circuit 2 and the power consumption limit amount PL output from the adder 8 are supplied to the ABL circuit 4. The ABL circuit 4 has luminance limit characteristics that are saturated at the power consumption limit amount PL output from the adder 8. The ABL circuit 4 calculates a luminance limit amount BL based on the luminance limit characteristics, the average luminance level APL and the power consumption limit amount PL.

The luminance level control circuit 5 determines a display drive condition BC such as the number of the discharge sustain pulses based on the luminance limit amount BL output from the ABL circuit 4. The PDP drive controller 6 drives the display panel 20 based on the input video signal VD and the display drive condition BC determined by the luminance level control circuit 5.

Figure 2:
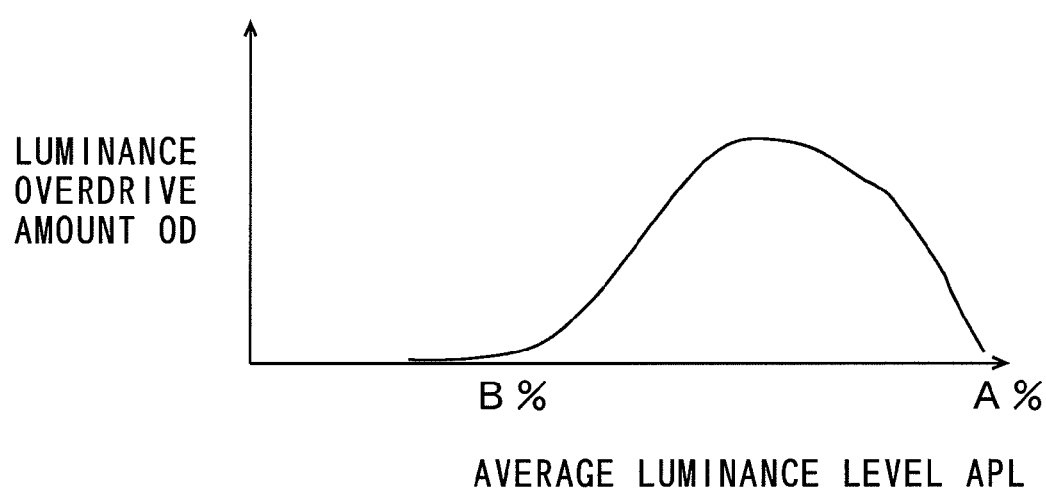
FIG. 2 is a diagram showing an example of output characteristics of a luminance overdrive amount calculating circuit.
Figure 3:
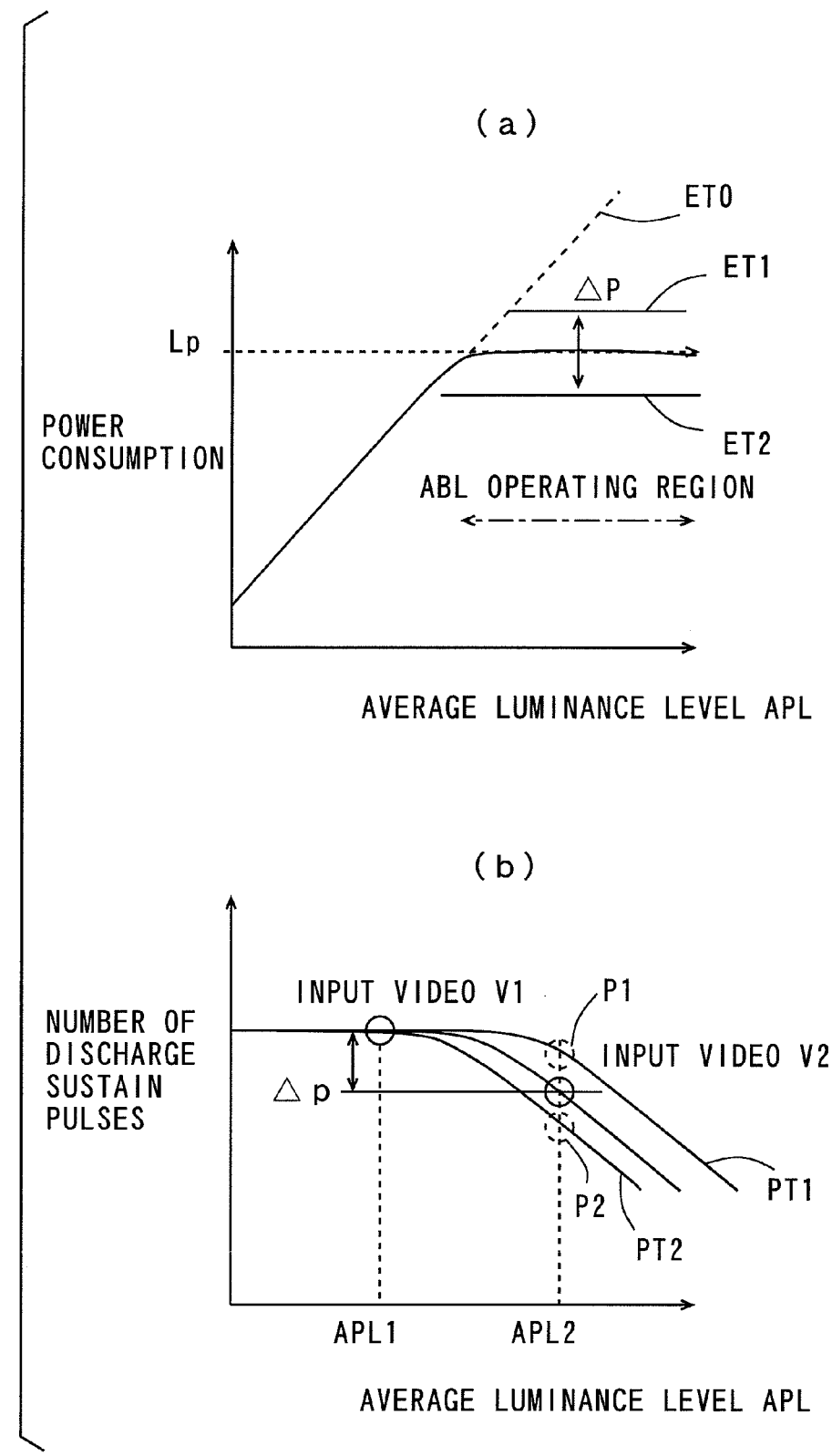
FIG. 3 is a diagram showing operating characteristics of an ABL circuit, a luminance level control circuit and a PDP drive controller.
Figure 4:
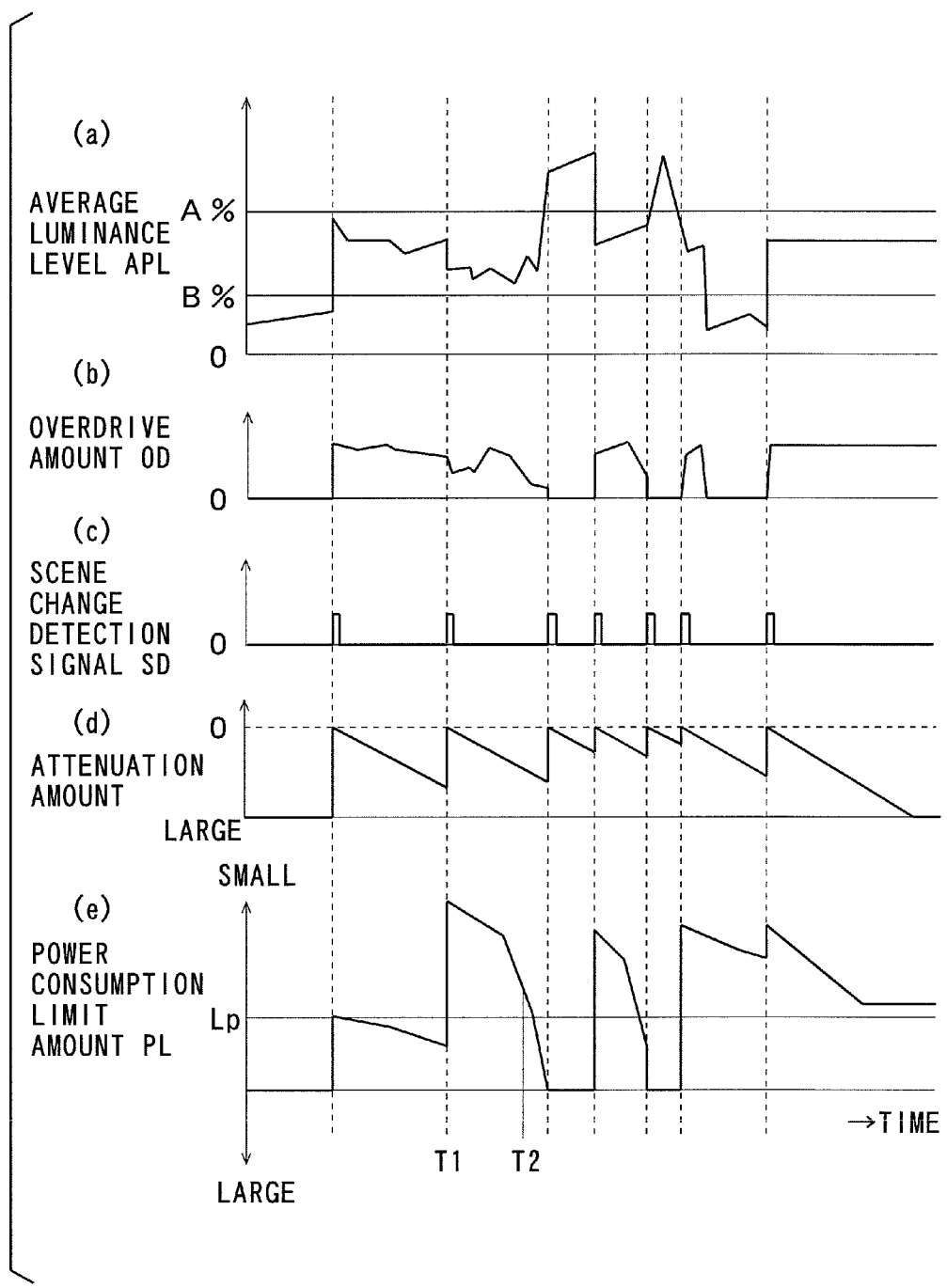
FIG. 4 is a timing chart showing an operation of the luminance level control device according to the first embodiment.

Next, an operation of the luminance level control device 100 of FIG. 1 is concretely described while referring to FIGS. 2 to 4.

FIG. 2 is a diagram showing an example of output characteristics of the luminance overdrive amount calculating circuit 3.

The ABL function operates when the average luminance level APL of the input video signal VD is higher than a predetermined value (hereinafter referred to as a "high average luminance level period"). In the present embodiment, the ABL function operates when the average luminance level is not less than B %. As shown in FIG. 2, the output characteristics of the luminance overdrive amount calculating circuit 3 is set such that the luminance overdrive amount OD is larger than zero in the high average luminance level period (when the average luminance level is not less than B %).

In addition, when the average luminance level APL is excessively high (larger than A %), the luminance overdrive amount OD attains zero or a value near zero in the present embodiment, because, when the average luminance level APL is excessively high, video of sufficiently high luminance can be displayed even though the ABL function operates in a large limit state of power consumption.

As described in the foregoing, the luminance overdrive amount OD attains zero or a value near zero when the average luminance level APL is smaller than B % and the ABL function therefore does not operate, or larger than A %, while the luminance overdrive amount OD is set depending on the average luminance level APL when the average luminance level APL is not less than B % and not more than A % and the ABL function therefore operates.

FIG. 3 is a diagram showing operating characteristics of the ABL circuit 4, the luminance level control circuit 5 and the PDP drive controller 6.

FIG. 3 (a) shows the relationship between the average luminance level APL and power consumption, and FIG. 3 (b) shows the relationship between the average luminance level APL and the number of the discharge sustain pulses. The average luminance level APL is an average luminance level of the video displayed by the video signal to be input. The larger the number of the discharge sustain pulses is, the higher the luminance level of the video to be displayed is.

When the ABL operation is not carried out in a region (ABL operating region) of the high average luminance level, power consumption linearly increases with the increase in the average luminance level APL as indicated by the dotted line ET0 in FIG. 3 (a).

In the ABL circuit 4 according to the present embodiment, the number of the discharge sustain pulses is suppressed in the region (ABL operation region) of the high average luminance level as shown in FIG. 3 (b). As a result, the increase in power consumption in the region of the high average luminance level is suppressed as shown in FIG. 3 (a). Note that the APL1 of FIG. 3 (b) is a lower limit value of the average luminance level APL at which the ABL function operates.

Next, description is made of an operation of the luminance level control device 100 according to the present embodiment with reference to FIG. 4. FIG. 4 is a timing chart showing the operation of the luminance level control device 100 according to the first embodiment.

In FIG. 4, the dotted lines on the ordinate indicate time in which scene changes are detected by the scene change detecting circuit 1.

FIG. 4 (a) shows, in a time series, changes in the average luminance level APL of the video signal VD input to the average luminance level operating circuit 2.

FIG. 4 (b) shows, in a time series, changes in the luminance overdrive amount OD output from the luminance overdrive amount calculating circuit 3 when the video signal VD having the average luminance level APL of FIG. 4 (a) is input. The luminance overdrive amount OD is calculated by the luminance overdrive amount calculating circuit 3 based on the average luminance level APL of FIG. 4 (a).

FIG. 4 (c) shows the scene change detection signal SD output from the scene change detecting circuit 1.

FIG. 4 (d) shows, in a time series, changes in the attenuation amount generated by the time-linked attenuating circuit 7 when the video signal VD having the average luminance level APL of FIG. 4 (a) is input. In the present embodiment, the attenuation amount linearly increases from zero with an elapse of time in response to rise of the scene change detection signal SD. After that, when the scene change detection signal SD rises, the attenuation amount is reset to zero and again linearly increases with an elapse of time. After the attenuation amount reaches a predetermined value, the attenuation amount is held at a fixed value that is arbitrarily set. A result of subtracting the attenuation amount of FIG. 4 (d) from the luminance overdrive amount OD of FIG. 4 (b) is output as the power consumption limit correction amount PA from the time-linked attenuating circuit 7.

FIG. 4 (e) shows, in a time series, changes in the power consumption limit amount PL output from the adder 8 when the video signal VD having the average luminance level APL of FIG. 4 (a) is input. The result of adding the power consumption limit correction amount PA and the reference power consumption limit value Lp is output as the power consumption limit amount PL from the adder 8.

The luminance limit amount BL is controlled by the ABL circuit 4 based on the power consumption limit amount PL of FIG. 4 (e). Then, the number of the discharge sustain pulses is controlled by the luminance level control circuit 5 based on the luminance limit amount BL.

Further specific description is made of the control of the number of the discharge sustain pulses.

First, the control of the number of the discharge sustain pulses at time T1 of FIG. 4 is described. Time T1 is a time at which the scene change is detected. As shown in FIG. 4 (d), the attenuation amount is zero at time T1. This decreases the limit of power consumption and thus increases the number of the discharge sustain pulses, resulting in a high luminance.

Next, the control of the number of the discharge sustain pulses at time T2 of FIG. 4 is described. Time T2 is a time at which a certain period of time has elapsed since the scene change was detected. As shown in FIG. 4 (d), the attenuation amount is large at time T2 because the certain period of time has elapsed since the scene change was detected. This increases the limit of power consumption and thus decreases the number of the discharge sustain pulses. In this case, power consumption is reduced.

In FIG. 3, consideration is made on a case where the input video V1 having the average luminance level APL1 is supplied and a case where the input video V2 having the average luminance level APL2 that is higher than the average luminance level APL1 is supplied, for example. The input video is video displayed by the video signal to be input.

The number of the discharge sustain pulses at the time of detection of the scene change is large as indicated by the solid line PT1 in FIG. 3 (b). The number of the discharge sustain pulses when the input video V2 is supplied attains a value of the point P1. This results in a high luminance. In this case, power consumption increases as indicated by the solid line ET1 in FIG. 3 (a).

On the other hand, when time has elapsed since the scene change was detected, the number of the discharge sustain pulses decreases as indicated by the solid line PT2 in FIG. 3 (b). The number of the discharge sustain pulses when the input video V2 is supplied attains a value of the point P2, resulting in a low luminance. In this case, power consumption is reduced as indicated by the solid line ET2 in FIG. 3 (a).

In the above-described example, power consumption is reduced by AP depending on an elapse of time since the scene change was detected, as shown in FIG. 3 (a).

In the luminance level control device 100 according to the present embodiment, high power is transiently applied using the luminance overdrive amount OD at the time of the scene change, so that a high luminance is achieved. Moreover, power consumption is attenuated with an elapse of time after the scene change. That is, luminance and power consumption are temporally dispersed, so that display with a high luminance and reduction in power consumption can be achieved and a user can easily recognize the scene change.

In particular, power consumption can be sufficiently reduced with time in video with a small number of scene changes. In general video, the ratio of video with a small number of scene changes is higher than the ratio of video with a large number of scene changes. Therefore, the luminance level control device 100 according to the present embodiment sufficiently enables a high luminance and low power consumption.

In addition, when the average luminance level APL is larger than a predetermined value at the time of the scene change, an excessively small limit of power consumption can be prevented.

Note that two threshold values A % and B %, in which A=70 and B=30, for example, are employed in the output characteristics of the luminance overdrive amount calculating circuit 3 in the present embodiment.

Generally, most of the average luminance levels APL of the video signals are in a range from 30% to 70%. Therefore, an operating range of the luminance overdrive amount calculating circuit 3 is limited in a range where the average luminance level APL is within not 0% to 100% but 30% to 70%, so that the range of the average luminance level APL when the luminance overdrive amount calculating circuit 3 calculates the luminance overdrive amount OD is decreased. This relaxes a constraint condition in design of the luminance overdrive amount calculating circuit 3. This facilitates the design of the luminance overdrive amount calculating circuit 3.

While the threshold value B in the output characteristics of the luminance overdrive amount calculating circuit 3 matches the average luminance level APL1, which is the lower limit value in the operating range of the ABL function shown in FIG. 3 (b) in the present embodiment, the threshold value B may be set to a value that is larger than the lower limit value in the operating range of the ABL function. This prevents such a malfunction that the luminance overdrive amount calculating circuit 3 calculates the luminance overdrive amount OD although the average luminance level APL is a value at which the ABL function does not operate.

(2) Second Embodiment

Figure 5:
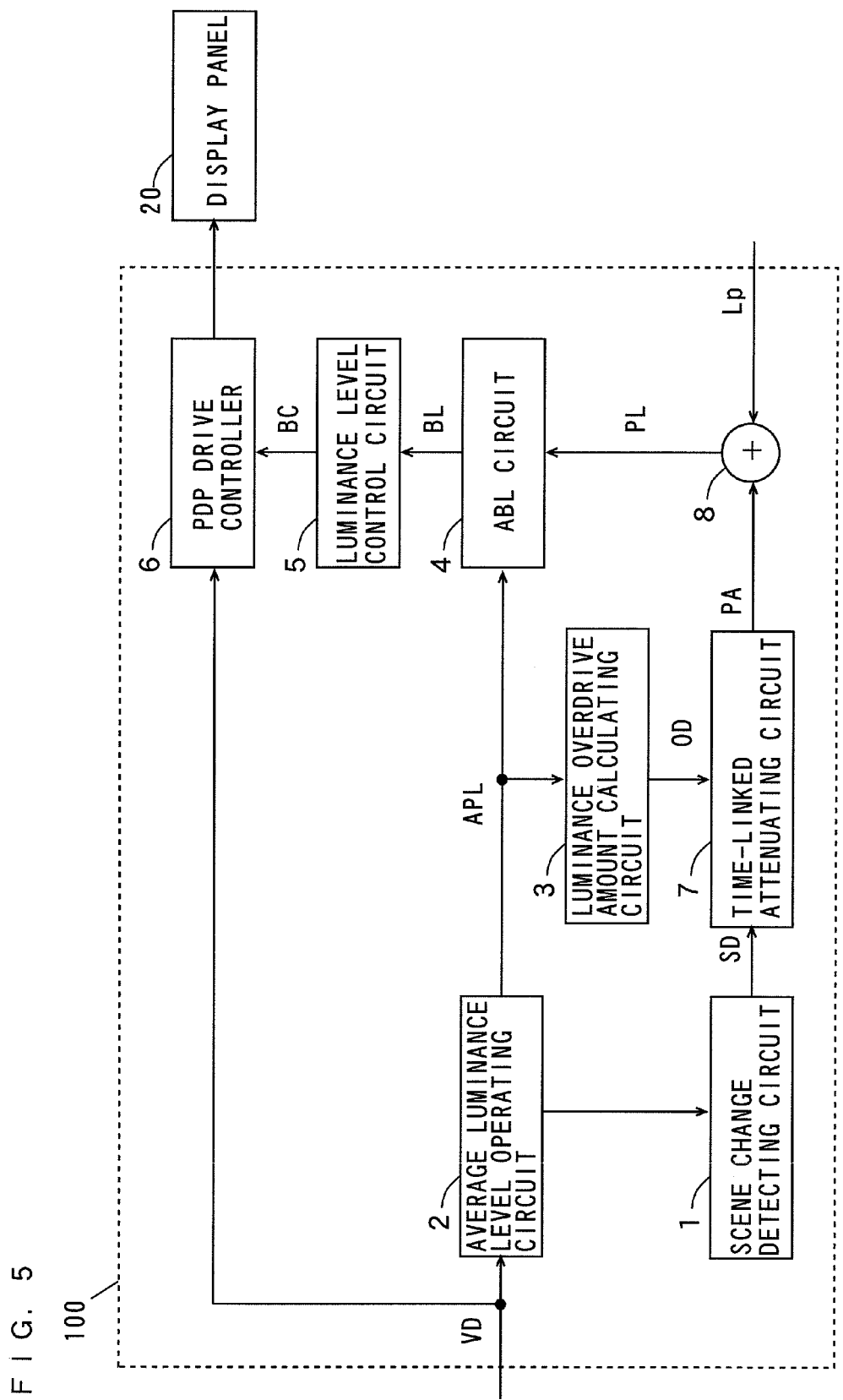
FIG. 5 is a block diagram showing the configuration of a luminance level control device according to a second embodiment of the present invention.

FIG. 5 is a block diagram showing the configuration of a luminance level control device according to a second embodiment of the present invention.

The luminance level control device 100 shown in FIG. 5 is different from the luminance level control device 100 shown in FIG. 1 in that the scene change detecting circuit 1 detects the scene change based on the average luminance level APL output from the average luminance level operating circuit 2. Since the configuration and operation of other parts of the luminance level control device 100 of FIG. 5 is the same as the configuration and operation of the corresponding parts of the luminance level control device 100 of FIG. 1, the same portions are denoted by the same reference numerals and hence, the detailed description thereof is omitted.

The scene change detecting circuit 1 detects the scene change using the following method, for example. When a difference between the average luminance level of a preceding frame and the average luminance level of a current frame is not less than a predetermined value, it is judged that the scene change has been carried out. Or when dispersion in the average luminance level of the preceding ten screens of video is not less than a predetermined value, it is judged that the scene change has been carried out. Alternatively, when a difference between the average luminance level of the past four frames and the average luminance level of the further preceding four frames is not less than a predetermined value, it is judged that the scene change was carried out. The foregoing three methods may be combined.

Also in the luminance level control device 100 according to the present embodiment, display of a high luminance and reduction in power consumption can be realized, similarly to the luminance level control device 100 according to the first embodiment.

(3) Third Embodiment

Figure 6:
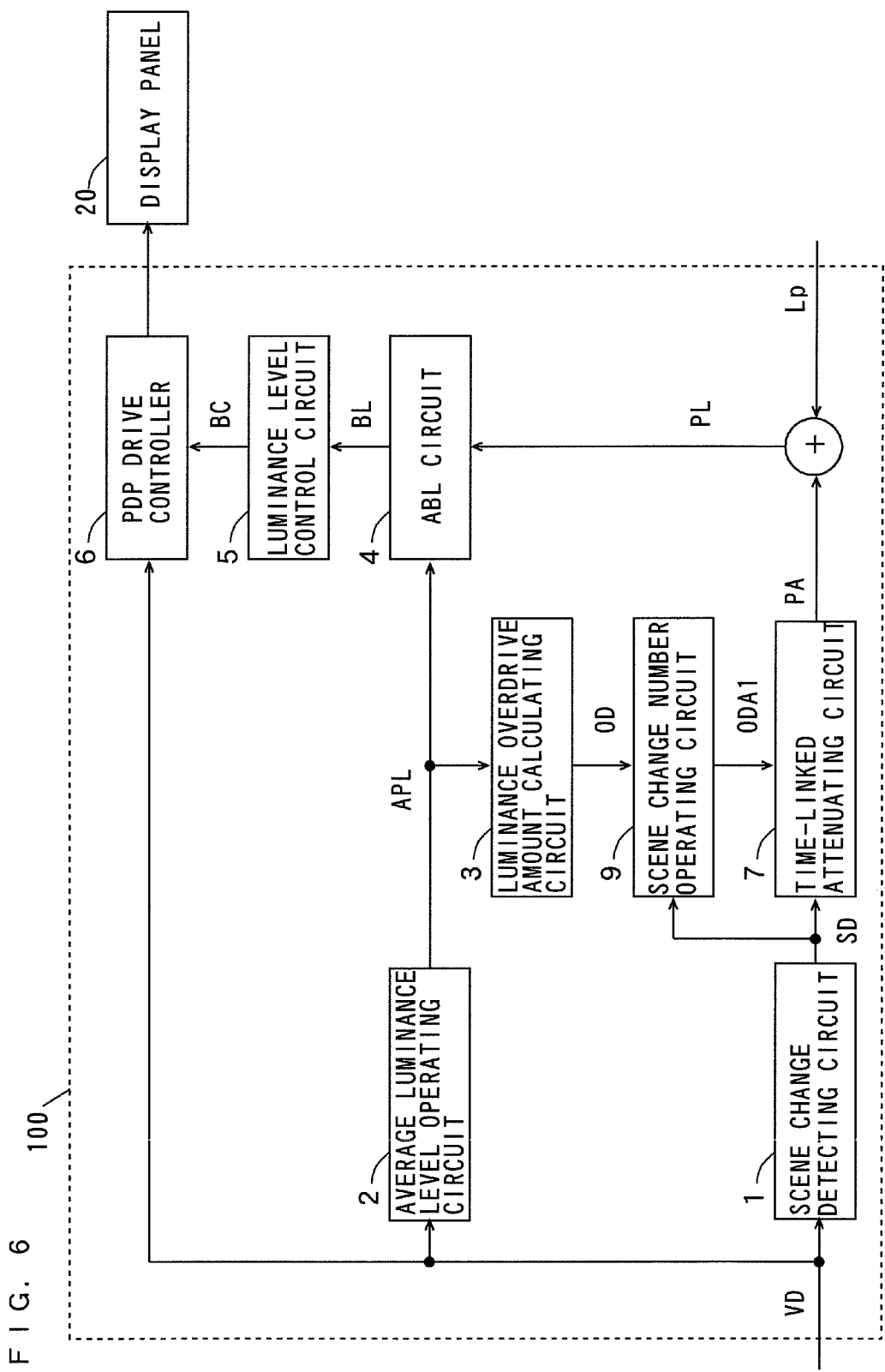
FIG. 6 is a block diagram showing the configuration of a luminance level control device according to a third embodiment of the present invention.

FIG. 6 is a block diagram showing the configuration of a luminance level control device according to a third embodiment of the present invention.

The luminance level control device 100 shown in FIG. 6 is different from the luminance level control device 100 shown in FIG. 1 in that a scene change number operating circuit 9 is further provided. Since the configuration and operation of other parts of the luminance level control device 100 of FIG. 6 is the same as the configuration and operation of the corresponding parts of the luminance level control device 100 of FIG. 1, the same portions are denoted by the same reference numerals and hence, the detailed description thereof is omitted.

The scene change detection signal SD output from the scene change detecting circuit 1 and the luminance overdrive amount OD output from the luminance overdrive amount calculating circuit 3 are supplied to the scene change number operating circuit 9.

The scene change number operating circuit 9 counts the number of the scene changes within a unit time based on the scene change detection signal SD. Then, the scene change number operating circuit 9 obtains a luminance overdrive suppression amount based on the counted number of the scene changes within a unit time and the operating characteristics that is preset.

Figure 7:
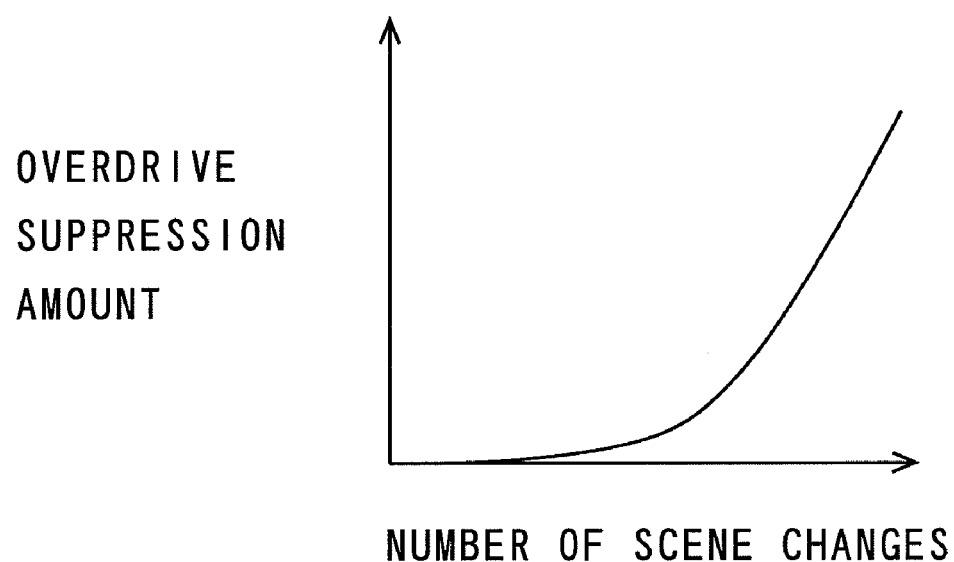
FIG. 7 is a diagram showing operating characteristics of a scene change number operating circuit.

FIG. 7 is a diagram showing the operating characteristics of the scene change number operating circuit 9.

The operating characteristics of FIG. 7 present the relationship between the number of the scene changes within a unit time and the luminance overdrive suppression amount. The abscissa of FIG. 7 represents the number of the scene changes within a unit time, and the ordinate represents the luminance overdrive suppression amount. The luminance overdrive suppression amount becomes larger as the number of the scene changes within a unit time increases. The relationship between the number of the scene changes and the luminance overdrive suppression amount is stored in the scene change number operating circuit 9 in advance.

The scene change number operating circuit 9 corrects the luminance overdrive amount OD by subtracting the luminance overdrive suppression amount from the luminance overdrive amount OD, and outputs the corrected luminance overdrive amount to the time-linked attenuating circuit 7 as a corrected luminance overdrive amount ODA1.

The time-linked attenuating circuit 7 subtracts the attenuation amount from the corrected luminance overdrive amount ODA1, so that the power consumption limit correction amount PA is output.

When the number of the scene changes within a unit time is large, a high-power consumption state continues. In such a case, the luminance overdrive amount OD is suppressed by the scene change number operating circuit 9 so that the high-power consumption state will not continue.

In the luminance level control device 100 according to the present embodiment, continuation of power consumption in a small limit state can be prevented when the scene change frequently occurs. Accordingly, the increase in power consumption can be suppressed even when the scene change frequently occurs.

(4) Fourth Embodiment

Figure 8:
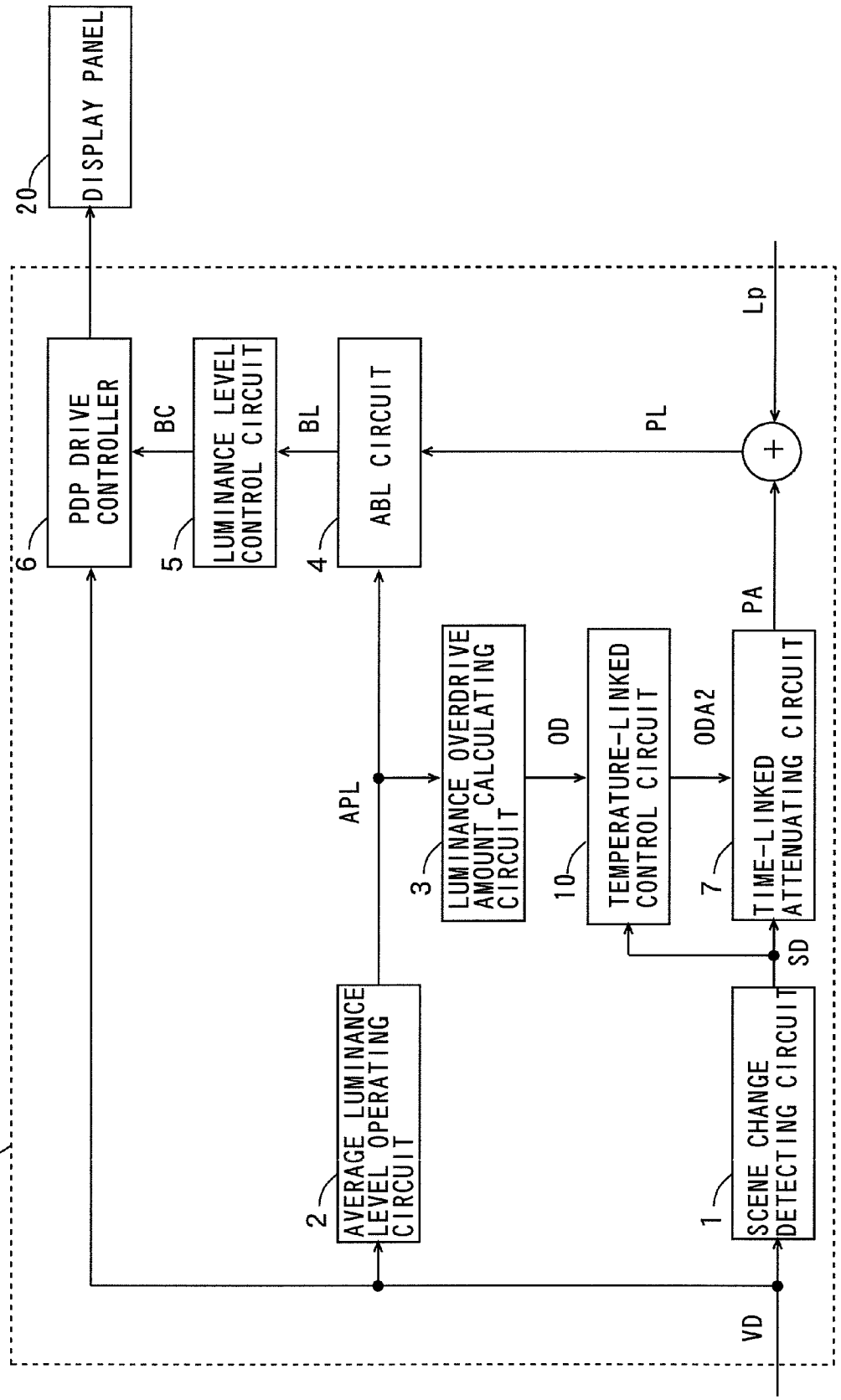
FIG. 8 is a block diagram showing the configuration of a luminance level control device according to a fourth embodiment of the present invention.

FIG. 8 is a block diagram showing the configuration of a luminance level control device according to a fourth embodiment of the present invention.

The luminance level control device 100 shown in FIG. 8 is different from the luminance level control device 100 shown in FIG. 1 in that a temperature-linked control circuit 10 is further provided. Since the configuration and operation of other parts of the luminance level control device 100 of FIG. 8 is the same as the configuration and operation of the corresponding parts of the luminance level control device 100 of FIG. 1, the same portions are denoted by the same reference numerals and hence, the detailed description thereof is omitted.

The scene change detection signal SD output from the scene change detecting circuit 1 and the luminance overdrive amount OD output from the luminance overdrive amount calculating circuit 3 are supplied to the temperature-linked control circuit 10.

The temperature-linked control circuit 10 measures an ambient temperature of the luminance level control device 100. The ambient temperature is a temperature of a peripheral apparatus itself having low heat resistance arranged on the periphery of the luminance level control device 100 or a temperature of surroundings of the peripheral apparatus, for example. The peripheral apparatus having low heat resistance is a power supply circuit or the display panel 20, for example. Then, the temperature-linked control circuit 10 obtains the luminance overdrive suppression amount based on the measured ambient temperature and the preset operating characteristics.

FIG. 9 is a diagram showing the operating characteristics of the temperature-linked control circuit 10.

The operating characteristics of FIG. 9 present the relationship between the ambient temperature and the luminance overdrive suppression amount. The abscissa of FIG. 9 represents the ambient temperature, and the ordinate represents the luminance overdrive suppression amount. The luminance overdrive suppression amount becomes larger as the ambient temperature increases. The relationship between the ambient temperature and the luminance overdrive suppression amount is stored in the temperature-linked control circuit 10 in advance.

The temperature-linked control circuit 10 corrects the luminance overdrive amount OD by subtracting the luminance overdrive suppression amount from the luminance overdrive amount OD, and outputs the corrected luminance overdrive amount to the time-linked attenuating circuit 7 as a corrected luminance overdrive amount ODA2.

The time-linked attenuating circuit 7 subtracts the attenuation amount from the corrected luminance overdrive amount ODA2, so that the power consumption limit correction amount PA is output.

In the case of the frequent scene changes, a high-power consumption state continues to raise the temperature of the luminance level control device 100, resulting in rise in the ambient temperature. In such a case, the luminance overdrive amount OD is suppressed by the temperature-linked control circuit 10 so that the high-power consumption state will not continue.

In the luminance level control device 100 according to the present embodiment, the increase in power consumption caused by the frequent scene changes can be suppressed. In addition, a failure of the peripheral apparatus caused by the heat of the luminance level control device 100 can be prevented.

(5) Fifth Embodiment

Figure 10:
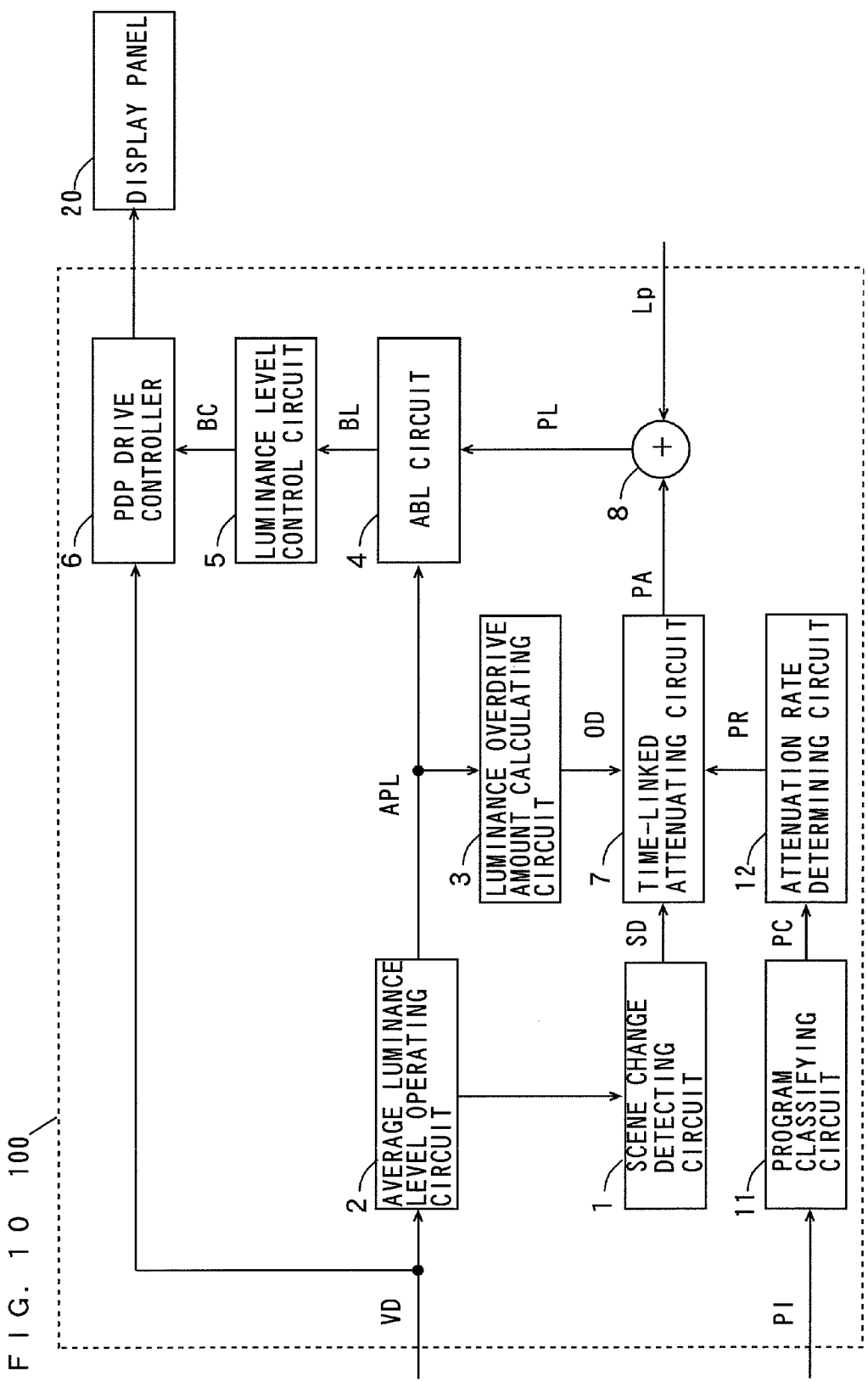
FIG. 10 is a block diagram showing the configuration of a luminance level control device according to a fifth embodiment of the present invention.

FIG. 10 is a block diagram showing the configuration of a luminance level control device according to a fifth embodiment of the present invention.

The luminance level control device 100 shown in FIG. 10 is different from the luminance level control device 100 shown in FIG. 5 in that a program classifying circuit 11 and an attenuation rate determining circuit 12 are further provided. Since the configuration and operation of other parts of the luminance level control device 100 of FIG. 10 is the same as the configuration and operation of the corresponding parts of the luminance level control device 100 of FIG. 5, the same portions are denoted by the same reference numerals and hence, the detailed description thereof is omitted.

Program information PI is supplied to the program classifying circuit 11. The program information PI for identifying a program corresponding to the video signal VD to be input includes a broadcast station, a channel, a program title, a date of broadcasting, a type (genre) of a program and so on. The program information PI is sent on a regular basis from a broadcast station, for example. Moreover, the program information PI may be obtained through the Internet and so on. An EPG (Electronic Program Guide), for example, can be used as the program information PI.

The program classifying circuit 11 judges a classification of a program corresponding to the video signal VD to be input based on the program information PI, and outputs a program classification signal PC indicating the classification of the program. The classification of the program is set in advance based on the number of the scene changes. A news program, a sports program, a variety program, a movie program and so on are taken as examples. The number of the scene changes is small in a news program, and is large in a sports program, for example.

The attenuation rate determining circuit 12 determines an attenuation rate based on the program classification signal PC output from the program classifying circuit 11, and outputs an attenuation rate signal PR indicating the determined attenuation rate. Here, the attenuation rate means the ratio of an increase in the attenuation amount with respect to time.

In this case, the attenuation rate is set in advance in the attenuation rate determining circuit 12 for each classification of programs based on the number of the scene changes. For example, the attenuation rate of a news program is set smaller than the attenuation rate of a sports program.

The time-linked attenuating circuit 7 determines the attenuation rate of the attenuation amount based on the attenuation rate signal PR output from the attenuation rate determining circuit 12. A program in a classification of the large number of scene changes has a high attenuation rate of the attenuation amount, and a program in a classification of the small number of scene changes has a low attenuation rate of the attenuation amount.

Then, the time-linked attenuating circuit 7 outputs the power consumption limit correction amount PA by subtracting the attenuation amount from the luminance overdrive amount OD.

Figure 11:
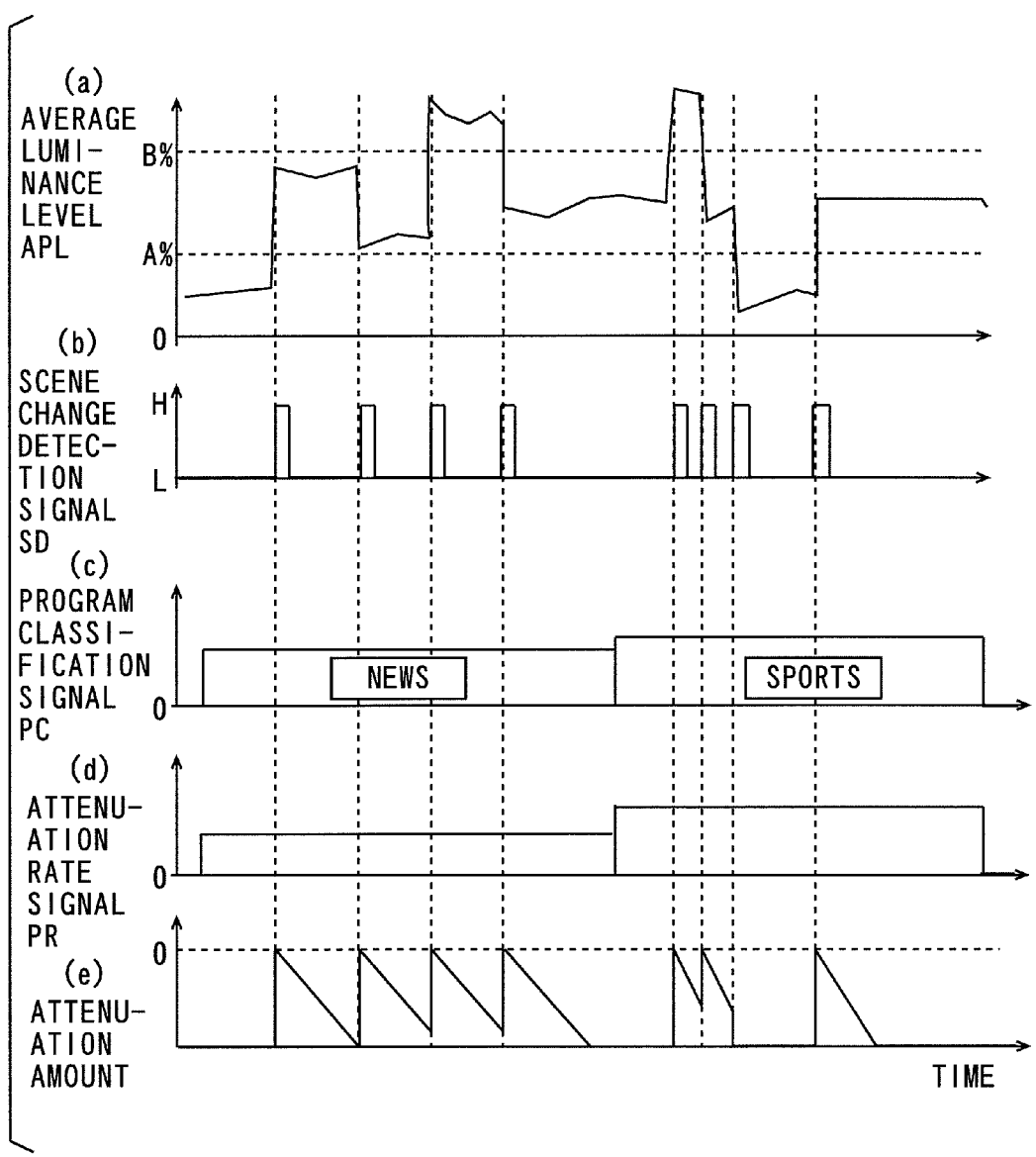
FIG. 11 is a timing chart showing an operation of the luminance level control device according to the fifth embodiment.

FIG. 11 is a timing chart showing the operation of the luminance level control device 100 according to the fifth embodiment.

FIG. 11 (a) shows, in a time series, changes in the average luminance level APL of the video signal VD input to the average luminance level operating circuit 2. FIG. 11 (b) shows the scene change detection signal SD output from the scene change detecting circuit 1.

FIG. 11 (c) shows, in a time series, changes in the program classification signal PC output from the program classifying circuit 11. In this example, the level of the program classification signal PC is low when the classification of the program corresponding to the video signal VD to be input is a news program, and the level of the program classification signal PC is high when the classification of the program corresponding to the video signal VD to be input is a sports program.

FIG. 11 (d) shows, in a time series, changes in the attenuation rate signal PR output from the attenuation rate determining circuit 12. In this example, the level of the attenuation rate signal PR is low when the level of the program classification signal PC is low, and the level of the attenuation rate signal PR is high when the level of the program classification signal PC is high.

FIG. 11 (e) shows, in a time series, changes in the attenuation amount generated by the time-linked attenuating circuit 7. In this example, the attenuation rate of the attenuation amount is low when the level of the attenuation rate signal PR is low, and the attenuation rate of the attenuation amount is high when the level of the attenuation rate signal PR is high.

In this manner, the attenuation rate of the attenuation amount generated by the time-linked attenuating circuit 7 is controlled depending on the classification of the program set based on the frequency of the scene changes.

In the luminance level control device 100 according to the present embodiment, the power consumption limit amount PL is increased in a short period of time every time the scene change is generated in a program having the large number of the scene changes. This suppresses the increase in power consumption caused by the frequent scene changes.

(6) Sixth Embodiment

Figure 12:
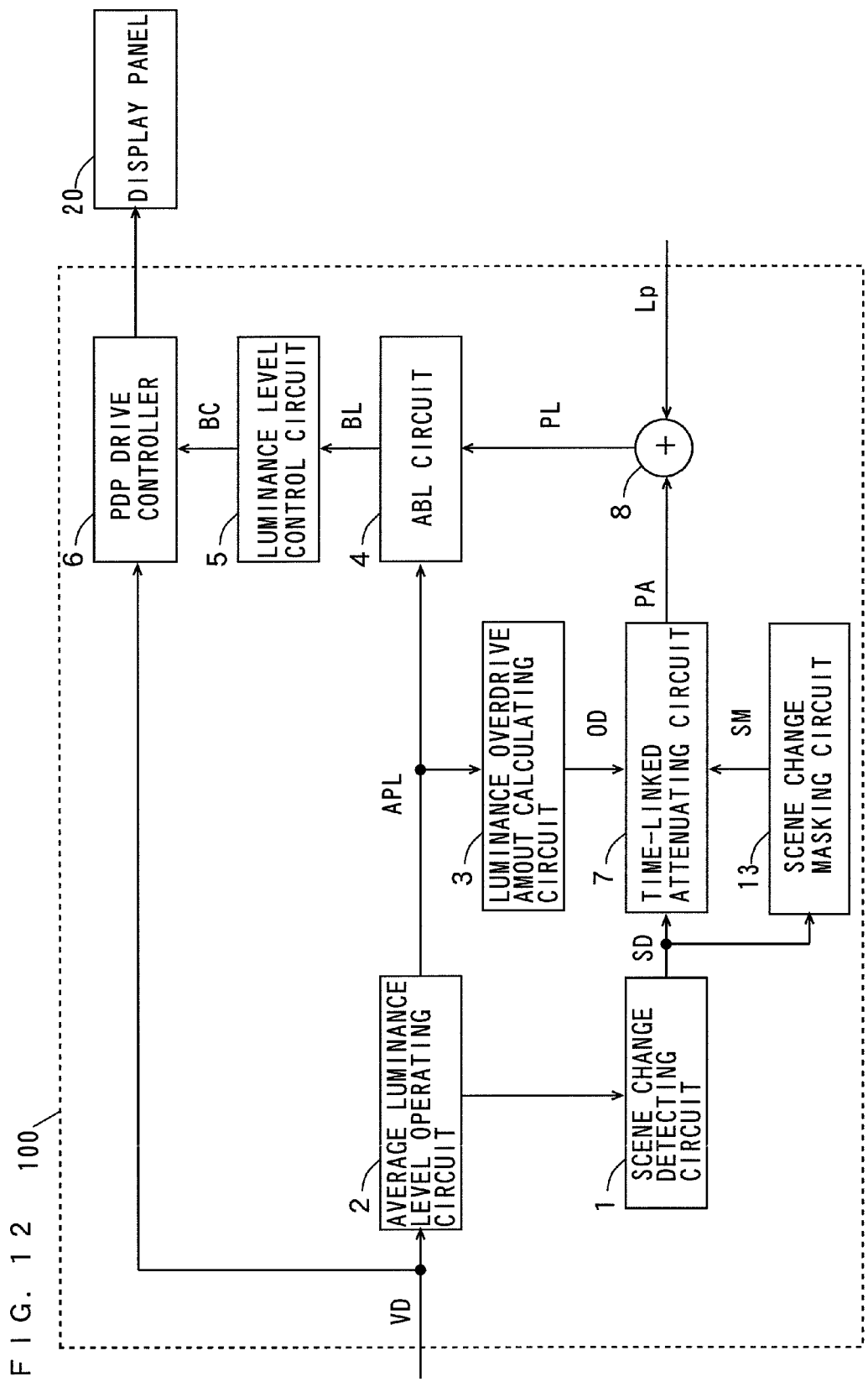
FIG. 12 is a block diagram showing the configuration of a luminance level control device according to a sixth embodiment of the present invention.

FIG. 12 is a block diagram showing the configuration of a luminance level control device according to a sixth embodiment of the present invention.

The luminance level control device 100 shown in FIG. 12 is different from the luminance level control device 100 shown in FIG. 5 in that a scene change masking circuit 13 is further provided. Since the configuration and operation of other parts of the luminance level control device 100 of FIG. 12 is the same as the configuration and operation of the corresponding parts of the luminance level control device 100 of FIG. 5, the same portions are denoted by the same reference numerals and hence, the detailed description thereof is omitted.

The scene change detection signal SD output from the scene change detecting circuit 1 is supplied to the scene change masking circuit 13. The scene change masking circuit 13 outputs a scene change mask signal SM that attains a high level for a certain period of time in response to rise of the scene change detection signal SD.

The time-linked attenuating circuit 7 generates the attenuation amount that increases with an elapse of time from a point in time of rise of the scene change mask signal SM output from the scene change masking circuit 13.

Then, the time-linked attenuating circuit 7 outputs the power consumption limit correction amount PA by subtracting the attenuation amount from the luminance overdrive amount OD.

Figure 13:
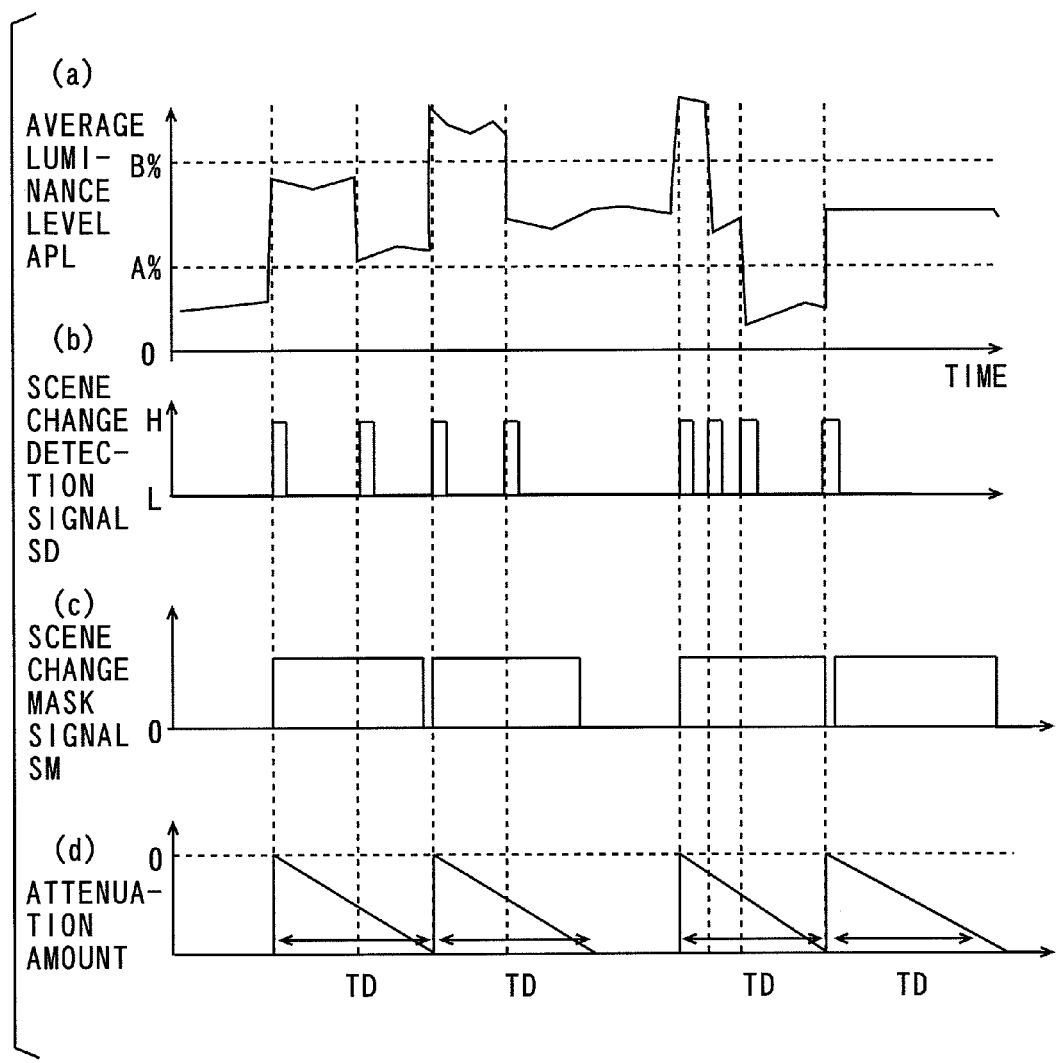
FIG. 13 is a timing chart showing an operation of the luminance level control device according to the sixth embodiment.

FIG. 13 is a timing chart showing the operation of the luminance level control device 100 according to the sixth embodiment.

FIG. 13 (a) shows, in a time series, changes in the average luminance level APL of the video signal VD input to the average luminance level operating circuit 2. FIG. 13 (b) shows the scene change detection signal SD output from the scene change detecting circuit 1.

FIG. 13 (c) shows, in a time series, changes in the scene change mask signal SM output from the scene change masking circuit 13. The scene change mask signal SM rises to a high level for a certain period of time. Therefore, the scene change detection signal SD in the certain period of time is masked.

FIG. 13 (d) shows, in a time series, changes in the attenuation amount generated by the time-linked attenuating circuit 7. An attenuation time TD of the attenuation amount is constant irrespective of the frequency of the scene changes. Note that the attenuation rate of the attenuation amount is constant in the present embodiment.

In this manner, the scene change generated in the certain period of time is ignored when the frequency of the scene changes is high, and the attenuation amount generated by the time-linked attenuating circuit 7 increases for the certain period of time.

In the luminance level control device 100 according to the present embodiment, the power consumption limit amount PL increases for the certain period of time from a point in time of detecting the scene change irrespective of the frequency of the scene changes, and the scene changes in the certain period of time are ignored. This suppresses the increase in power consumption caused by the frequent scene changes.

(7) Seventh Embodiment

Figure 14:
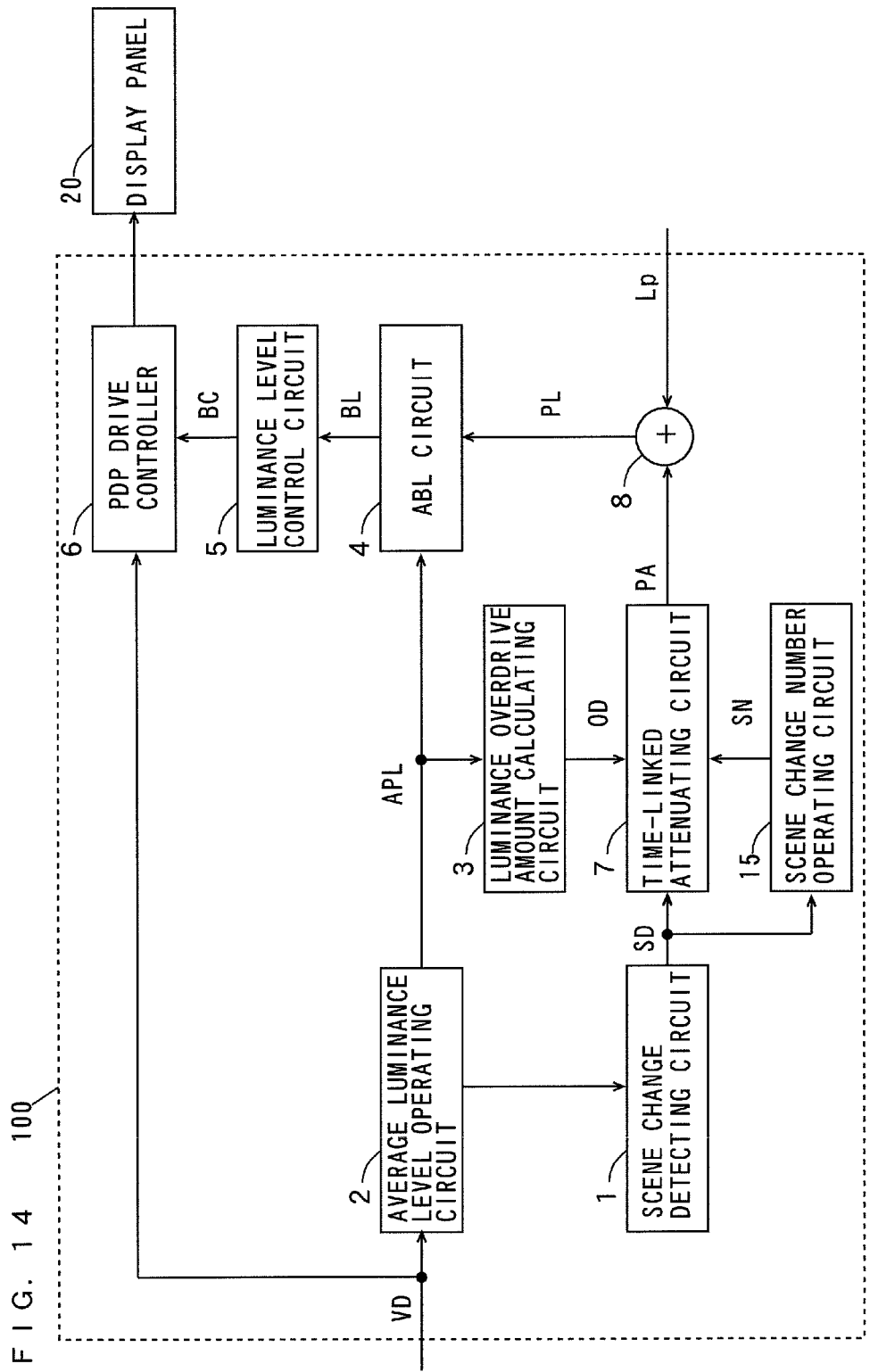
FIG. 14 is a block diagram showing the configuration of a luminance level control device according to a seventh embodiment of the present invention.
Figure 16:
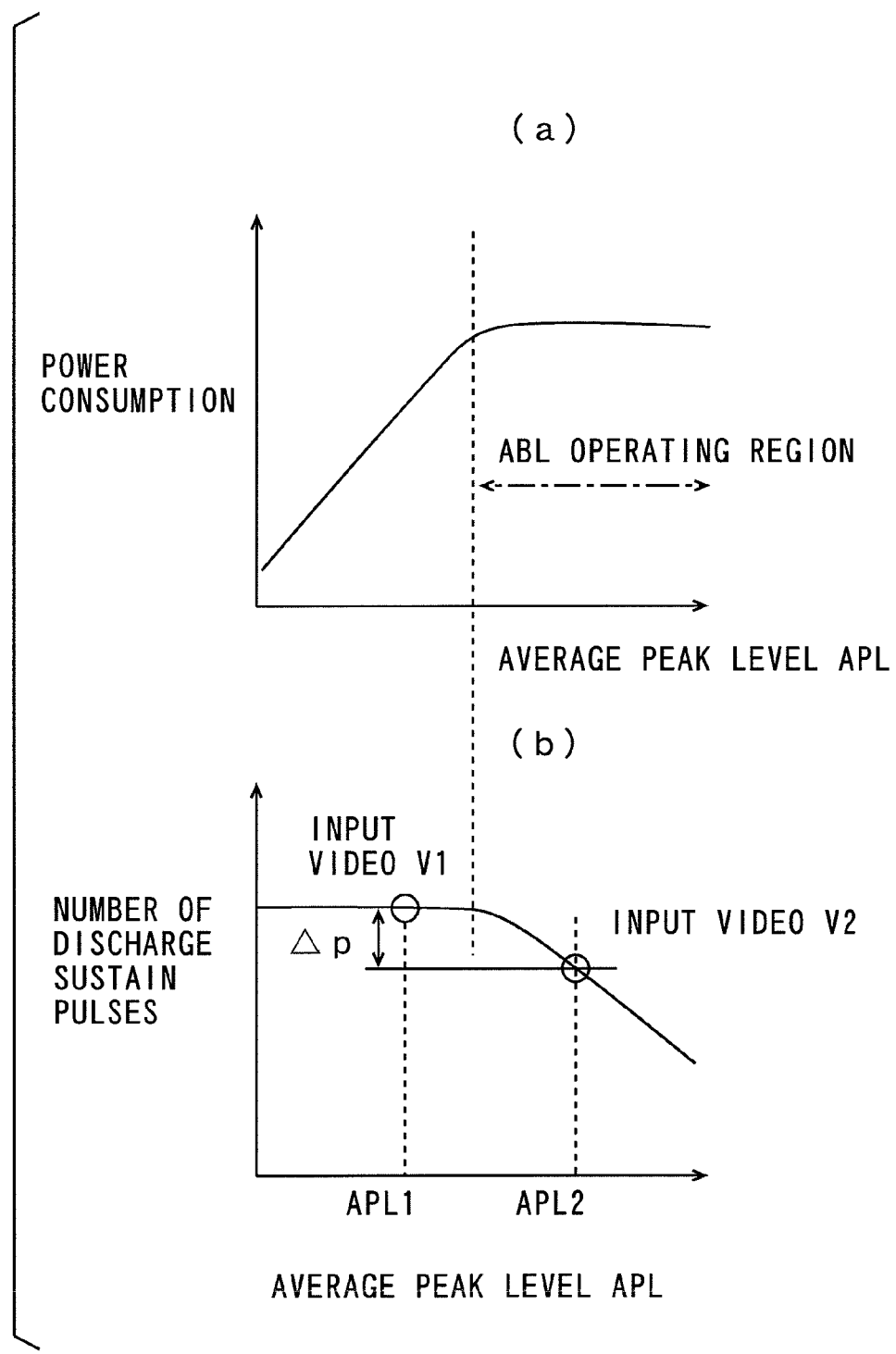
FIG. 16 is a diagram showing characteristics of an ABL function.
Figure 17:
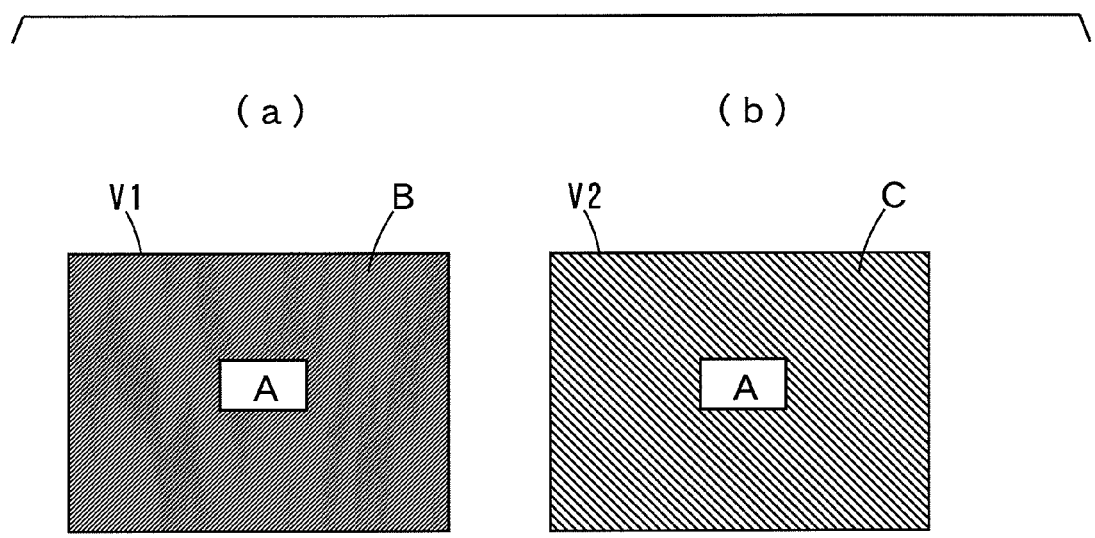
FIG. 17 is a schematic view for use in explaining the ABL function.
Figure 18:
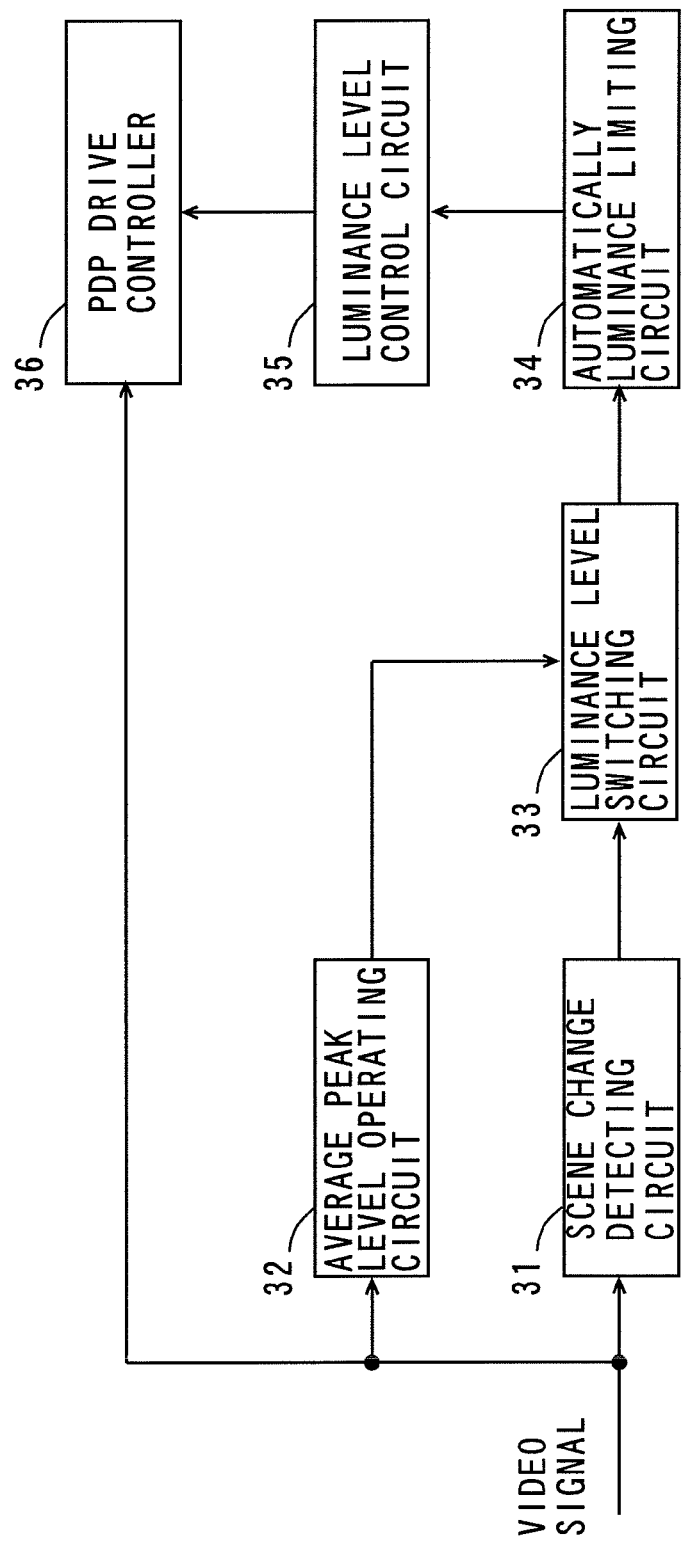
FIG. 18 is a block diagram showing the configuration of a conventional luminance level control device.
Figure 19:
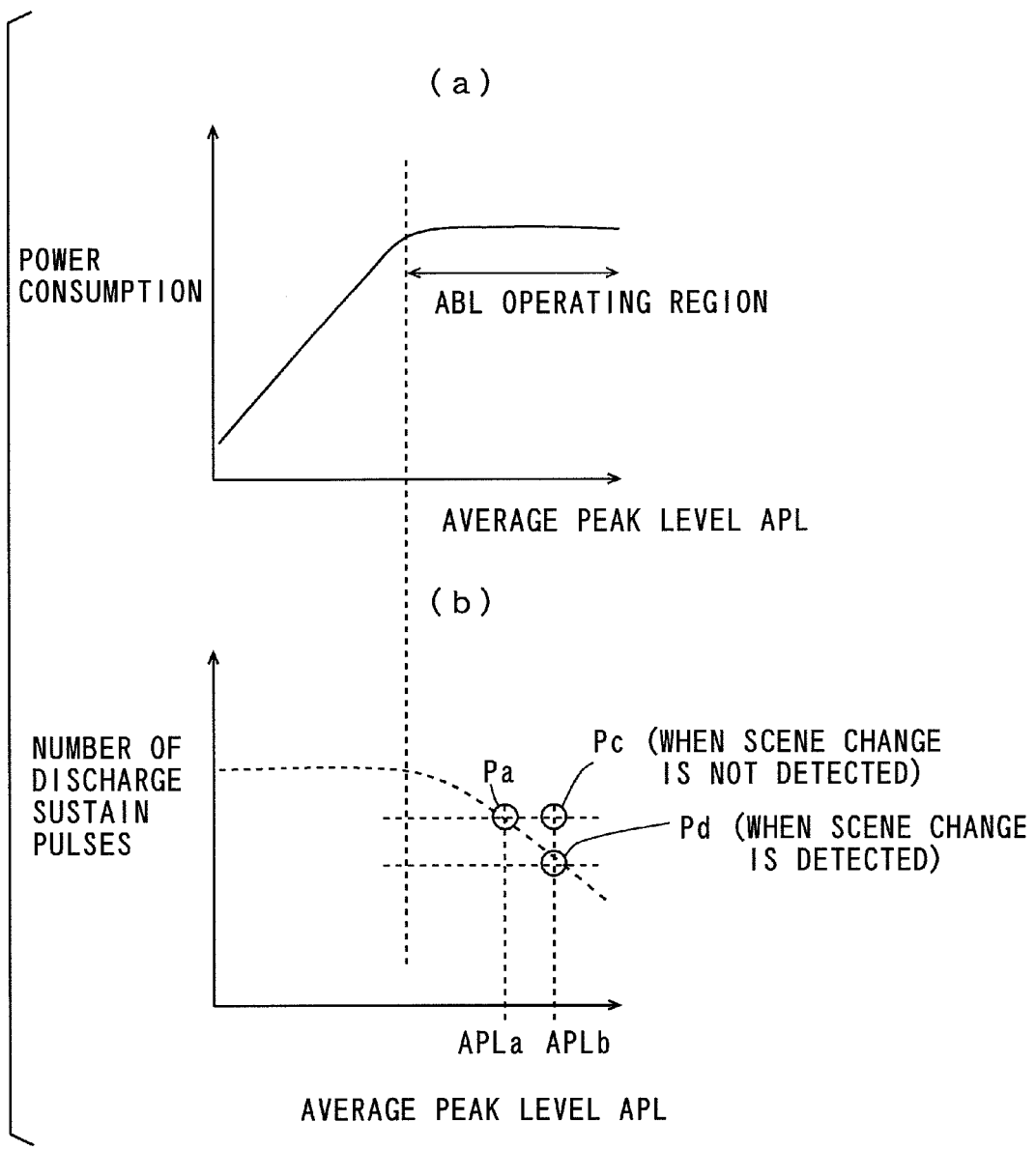
FIG. 19 is a diagram showing an operation of the luminance level control device of FIG. 18 in ABL characteristics.

FIG. 14 is a block diagram showing the configuration of a luminance level control device according to a seventh embodiment of the present invention.

The luminance level control device 100 shown in FIG. 14 is different from the luminance level control device 100 shown in FIG. 5 in that a scene change number operating circuit 15 is further provided. Since the configuration and operation of other parts of the luminance level control device 100 of FIG. 14 is the same as the configuration and operation of the corresponding parts of the luminance level control device 100 of FIG. 5, the same portions are denoted by the same reference numerals and hence, the detailed description thereof is omitted.

The scene change detection signal SD output from the scene change detecting circuit I is supplied to the scene change number operating circuit 15.

The scene change number operating circuit 15 counts the number of the scene changes within a unit time based on the scene change detection signal SD. Then, the scene change number operating circuit 15 supplies a scene change number signal SN representing the counted number of the scene changes within a unit time to the time-linked attenuating circuit 7.

The time-linked attenuating circuit 7 determines the attenuation rate of the attenuation amount based on the scene change number signal SN output from the scene change number operating circuit 15. The attenuation rate increases when the number of the scene changes within a unit time is large, and the attenuation rate decreases when the number of the scene changes within a unit time is small.

FIG. 15 is a timing chart showing the operation of the luminance level control device 100 according to the seventh embodiment.

FIG. 15 (*a*) shows, in a time series, changes in the average luminance level APL of the video signal VD input to the average luminance level operating circuit 2. FIG. 15 (*b*) shows the scene change detection signal SD output from the scene change detecting circuit 1.

FIG. 15 (*c*) shows, in a time series, changes in the scene change number signal SN output from the scene change number operating circuit 15. The level of the scene change number signal SN increases/decreases depending on the number of the scene changes within a unit time.

FIG. 15 (*d*) shows, in a time series, changes in the attenuation amount generated by the time-linked attenuating circuit 7. The attenuation rate changes depending on the level of the scene change number signal SN. The attenuation rate increases when the level of the scene change number signal SN is high, and the attenuation rate decreases when the level of the scene change number signal SN is low.

In this manner, the attenuation rate of the attenuation amount generated by the time-linked attenuating circuit 7 increases when the number of the scene changes within a unit time is large.

In the luminance level control device 100 according to the present embodiment, the power consumption limit amount PL increases in a short period of time every time the scene change is generated when the frequency of the scene changes is high. This suppresses the increase in power consumption caused by the frequent scene changes.

(8) Other Embodiments

In the luminance level control device 100 of FIGS. 6 and 8, similarly to the luminance level control device 100 of FIG. 5, the scene change detecting circuit 1 may detect the scene change based on the average luminance level APL calculated by the average luminance level operating circuit 2.

In addition, in the luminance level control device 100 of FIGS. 10, 12 and 14, similarly to the luminance level control device 100 of FIG. 1, the scene change detecting circuit 1 may detect the scene change based on the input video signal VD.

(9) Correspondences between Elements in the Claims and Parts in Embodiments

In the following paragraph, non-limiting examples of correspondences between various elements recited in the claims below and those described above with respect to various preferred embodiments of the present invention are explained.

In the above-described embodiments, the average luminance level operating circuit 2 is an example of a calculator, the scene change detecting circuit 1 is an example of a detector, and the luminance overdrive amount calculating circuit 3, the time-linked attenuating circuit 7 and the luminance level control circuit 5 are examples of a luminance controller. The luminance overdrive amount calculating circuit 3 is an example of a generator, the time-linked attenuating circuit 7 is an example of an attenuator, and the luminance level control circuit 5 is an example of a luminance level controller. The scene change number operating circuit 9 is an example of a first suppressor, the temperature-linked control circuit 10 is an example of a second suppressor, the program classifying circuit 11 is an example of a judger, the attenuation rate determining circuit 12 is an example of a first attenuation rate controller, the scene change masking circuit 13 is an example of an attenuation continuing controller, and the scene change number operating circuit 15 is an example of a second attenuation rate controller.

[Industrial Applicability]

The present invention can be effectively utilized for realizing a high luminance and low power consumption in a display device having an ABL function, for example.

The invention claimed is:

1. A luminance level control device that controls a luminance level of video displayed by a display, comprising:
   a calculator that calculates an average luminance level of an input video signal;
   a detector that detects a scene change of the video based on the input video signal; and
   a luminance controller that increases a luminance level of the video displayed in said display based on the video signal in response to detection of the scene change by said detector and attenuates the luminance level of said video with an elapse of time from a point in time of detecting the scene change by said detector.

2. The luminance level control device according to claim 1, wherein
   said luminance controller includes
   a generator that generates a luminance overdrive amount for increasing the luminance level depending on the average luminance level calculated by said calculator,
   an attenuator that attenuates the luminance overdrive amount generated by said generator based on the elapse of time from the point in time of detecting the scene change by said detector, and
   a luminance level controller that controls the luminance level of the video displayed in said display based on the luminance overdrive amount obtained by said attenuator.

3. The luminance level control device according to claim 2, wherein
   said attenuator generates an attenuation amount that changes with the elapse of time from the point in time of detecting the scene change by said detector, and attenuates the luminance overdrive amount by subtracting said generated attenuation amount from the luminance overdrive amount generated by said generator.

4. The luminance level control device according to claim 3, wherein the attenuation amount generated by said attenuator changes in proportion to the elapse of time from the point in time of detecting the scene change by said detector.

5. The luminance level control device according to claim 3, wherein the attenuation amount generated by said attenuator is maintained in a certain value after an elapse of a predetermined period of time from the point in time of detecting the scene change by said detector.

6. The luminance level control device according to claim 2, wherein said generator generates the luminance overdrive amount when the average luminance level calculated by said calculator is not less than a first threshold value and not more than a second threshold value.

7. The luminance level control device according to claim 2, further comprising a first suppressor that detects the number of the scene changes within a unit time and suppresses the luminance overdrive amount generated by said generator based on the number of the scene changes that is detected.

8. The luminance level control device according to claim 2, further comprising a second suppressor that measures an ambient temperature of said luminance level control device and suppresses the luminance overdrive amount generated by said generator based on the measured ambient temperature.

9. The luminance level control device according to claim 2, further comprising
 a judger that judges a classification of a program displayed by the input video signal, and
 a first attenuation rate controller that controls an attenuation rate of the luminance overdrive amount attenuated by said attenuator based on the classification of the program that is judged by said judger.

10. The luminance level control device according to claim 2, further comprising an attenuation continuing controller that controls said attenuator so that the luminance overdrive amount continues to be attenuated for a certain period of time from the point in time of detecting the scene change by said detector.

11. The luminance level control device according to claim 2, further comprising a second attenuation rate controller that detects the number of the scene changes within a unit time and controls an attenuation rate of the luminance overdrive amount attenuated by said attenuator based on the detected number of the scene changes.

* * * * *